US007935737B2

(12) United States Patent
Gopal et al.

(10) Patent No.: US 7,935,737 B2
(45) Date of Patent: *May 3, 2011

(54) ARTICLES DERIVED FROM COMPOSITIONS CONTAINING MODIFIED POLYBUTYLENE TEREPHTHALATE (PBT) RANDOM COPOLYMERS DERIVED FROM POLYETHYLENE TEREPHTHALATE (PET)

(75) Inventors: Vikram Gopal, Ypsilanti, MI (US); Ganesh Kannan, Evansville, IN (US); Kenneth Frederick Miller, Posey, IN (US); Dhaval Shah, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 821 days.

This patent is subject to a terminal disclaimer.

(21) Appl. No.: 11/668,189

(22) Filed: Jan. 29, 2007

(65) Prior Publication Data
US 2007/0275242 A1   Nov. 29, 2007

Related U.S. Application Data

(60) Provisional application No. 60/763,109, filed on Jan. 27, 2006, provisional application No. 60/763,083, filed on Jan. 27, 2006, provisional application No. 60/763,091, filed on Jan. 27, 2006, provisional application No. 60/763,082, filed on Jan. 27, 2006, provisional application No. 60/763,107, filed on Jan. 27, 2006, provisional application No. 60/820,456, filed on Jul. 26, 2006.

(51) Int. Cl.
  *C08J 11/04* (2006.01)
(52) U.S. Cl. ......... 521/48.5; 521/40; 521/40.5; 521/41; 521/44; 521/48; 528/271; 528/272; 528/279; 528/280; 528/283; 528/300; 528/480; 528/491; 528/495
(58) Field of Classification Search .................. 521/40, 521/40.5, 41, 42, 42.5, 47, 48, 49.5; 528/480, 528/489, 491, 495, 271, 272, 274, 275, 278, 528/279, 280, 282, 308.1, 308.2, 308.3, 308.5; 525/50, 55, 88, 165, 166, 167, 168, 326.1, 525/339, 360; 264/5, 37.1, 219, 23, 239; 524/474, 540
See application file for complete search history.

(56) References Cited

U.S. PATENT DOCUMENTS

| | | | |
|---|---|---|---|
| 2,465,319 A | 3/1949 | Whinfield et al. |
| 2,720,502 A | 10/1955 | Caldwell |
| 2,727,881 A | 12/1955 | Caldwell et al. |
| 2,822,348 A | 2/1958 | Haslam |
| 3,047,539 A | 7/1962 | Pengilly |
| 3,193,523 A | 7/1965 | Neumann et al. |
| 3,224,043 A | 12/1965 | Lameris et al. |
| 3,302,243 A | 2/1967 | Ludwig |
| 3,635,895 A | 1/1972 | Kramer |
| 3,671,487 A | 6/1972 | Abolins |
| 3,701,755 A | 10/1972 | Sumoto et al. |
| 3,864,428 A | 2/1975 | Nakamura et al. |
| 3,907,868 A | 9/1975 | Currie et al. |
| 3,907,926 A | 9/1975 | Brown et al. |
| 3,915,608 A | 10/1975 | Hujik |
| 3,953,394 A | 4/1976 | Fox et al. |
| 4,096,156 A | 6/1978 | Freudenberger et al. |
| 4,128,526 A | 12/1978 | Borman |
| 4,154,775 A | 5/1979 | Axelrod |
| 4,200,567 A | 4/1980 | Goldman et al. |
| 4,203,887 A | 5/1980 | Goedde et al. |
| 4,217,438 A | 8/1980 | Brunelle et al. |
| 4,264,487 A | 4/1981 | Fromuth et al. |
| 4,337,192 A | 6/1982 | Campbell |
| 4,355,155 A | 10/1982 | Nelsen |
| 4,469,851 A | 9/1984 | Charles et al. |
| 4,579,884 A | 4/1986 | Liu |
| 4,598,117 A | 7/1986 | Liu et al. |
| 4,609,680 A | 9/1986 | Fujita et al. |
| 4,657,973 A | 4/1987 | Endo et al. |
| 4,657,988 A | 4/1987 | Sugerman et al. |
| 4,670,203 A | 6/1987 | Chang |
| 4,767,668 A | 8/1988 | Smith et al. |

(Continued)

FOREIGN PATENT DOCUMENTS
EP 0135493 A1 3/1985
(Continued)

OTHER PUBLICATIONS

W. Hale et al., "Compatibilization of PBT/ABS blens by methyl methacrylate-glycidyl methacrylate-ethyl acrylate terpolymers," Polymer 40, 1999, pp. 365-377, Elsevier Science Ltd.

S.H. Mansour et al.,"Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.

(Continued)

*Primary Examiner* — James Seidleck
*Assistant Examiner* — Frances Tischler
(74) *Attorney, Agent, or Firm* — Cantor Colburn LLP; Diderico van Eyl

(57) ABSTRACT

Compositions of matter including articles derived from (a) from 5 to 99.99 wt % of a modified polybutylene terephthalate random copolymer that (1) is derived from polyethylene terephthalate and (2) contains a at least one residue derived from polyethylene terephthalate selected from the group consisting of antimony, germanium, diethylene glycol groups, isophthalic acid groups, cis isomer of cyclohexane dimethanol, trans isomer of cyclohexane dimethanol, sodium benzoate, alkali salts, napthalane dicarboxylic acids, 1,3-propane diols, cobalt, cobalt-containing compounds, and combinations thereof, and (b) from 0.01 to 95 wt. % of a member selected from the group consisting of (1) fillers, (2) a carboxy reactive component, (3) polyethyelene terephthalate, (4) a component including a polycarbonate and an impact modifier. The articles may be derived from various conversion processes, e.g., injection molding processes, extrusion processes, thermoforming processes, melt-blown process.

43 Claims, 3 Drawing Sheets

U.S. PATENT DOCUMENTS

| | | |
|---|---|---|
| 4,778,855 A | 10/1988 | Boutni et al. |
| 4,857,604 A | 8/1989 | Agarwal |
| 4,954,540 A | 9/1990 | Nakane et al. |
| 4,992,506 A | 2/1991 | McCormick et al. |
| 5,091,461 A | 2/1992 | Skochdopole |
| 5,122,551 A | 6/1992 | Gallucci et al. |
| 5,162,424 A | 11/1992 | de Boer et al. |
| 5,221,704 A | 6/1993 | Shimotsuma et al. |
| 5,232,773 A | 8/1993 | Itoh et al. |
| 5,266,601 A | 11/1993 | Kyber et al. |
| 5,302,645 A | 4/1994 | Nakano et al. |
| 5,304,594 A | 4/1994 | Saitou |
| 5,326,806 A | 7/1994 | Yokoshima et al. |
| 5,413,681 A | 5/1995 | Tustin et al. |
| 5,439,976 A | 8/1995 | Kinoshita et al. |
| 5,451,611 A * | 9/1995 | Chilukuri et al. ............ 521/48.5 |
| 5,484,875 A | 1/1996 | Sakashita et al. |
| 5,559,159 A | 9/1996 | Sublett et al. |
| 5,804,654 A | 9/1998 | Lo et al. |
| 5,900,446 A | 5/1999 | Nishihara et al. |
| 5,981,661 A | 11/1999 | Liao et al. |
| 6,020,414 A | 2/2000 | Nelsen et al. |
| 6,087,591 A | 7/2000 | Nguyen et al. |
| 6,127,465 A | 10/2000 | Nodera |
| 6,162,837 A | 12/2000 | Gerking et al. |
| 6,255,371 B1 | 7/2001 | Schlosser et al. |
| 6,384,129 B1 | 5/2002 | Lowry |
| 6,406,081 B1 | 6/2002 | Mahfet et al. |
| 6,410,607 B1 | 6/2002 | Ekart et al. |
| 6,444,283 B1 | 9/2002 | Turner et al. |
| 6,476,158 B1 | 11/2002 | England et al. |
| 6,515,044 B1 | 2/2003 | Idel et al. |
| 6,518,322 B1 | 2/2003 | West |
| 6,579,943 B1 | 6/2003 | Ishino et al. |
| 6,660,789 B2 | 12/2003 | Uno et al. |
| 6,706,843 B1 | 3/2004 | Ishihara et al. |
| 6,726,262 B2 | 4/2004 | Marijnissen et al. |
| 6,794,463 B2 | 9/2004 | Aramaki et al. |
| 6,849,684 B2 | 2/2005 | Poppe et al. |
| 6,887,909 B2 | 5/2005 | Kawamura et al. |
| 6,927,275 B2 | 8/2005 | Hirokane et al. |
| 7,179,869 B2 | 2/2007 | Hirokane et al. |
| 7,183,362 B2 | 2/2007 | Hirokane et al. |
| 7,388,067 B2 | 6/2008 | Leemans et al. |
| 7,462,649 B2 | 12/2008 | Nakao et al. |
| 7,498,368 B2 | 3/2009 | Harashina et al. |
| 7,550,203 B2 | 6/2009 | Ferrari et al. |
| 2002/0012807 A1 | 1/2002 | Kurian et al. |
| 2003/0013788 A1 * | 1/2003 | Mason et al. .................. 524/120 |
| 2006/0270824 A1 * | 11/2006 | Leemans et al. .............. 528/272 |
| 2007/0244242 A1 | 10/2007 | Agarwal et al. |
| 2007/0275242 A1 | 11/2007 | Gopal et al. |
| 2008/0125551 A1 | 5/2008 | Vollenberg |
| 2008/0169590 A1 | 7/2008 | Mehta et al. |

FOREIGN PATENT DOCUMENTS

| | | |
|---|---|---|
| EP | 0320651 A2 | 6/1989 |
| EP | 0400936 A1 | 12/1990 |
| EP | 0682080 A1 | 11/1995 |
| EP | 0683201 A1 | 11/1995 |
| EP | 0755977 A2 | 1/1997 |
| EP | 0846729 A2 | 6/1998 |
| GB | 1431916 | 4/1976 |
| GB | 1500577 | 2/1978 |
| GB | 2048285 A | 12/1980 |
| JP | 58-141236 A | 8/1983 |
| JP | 1-174557 A | 7/1989 |
| JP | 3-62848 A | 3/1991 |
| JP | 4-345655 A | 12/1992 |
| JP | 6-240121 A | 8/1994 |
| JP | 8-269311 A | 10/1996 |
| JP | 2000-256472 A | 9/2000 |
| JP | 2000-256920 A | 9/2000 |
| JP | 2001-31851 A | 2/2001 |
| JP | 2002-179801 A | 6/2002 |
| JP | 2005-89572 | 7/2005 |
| JP | 2006063199 A | 3/2006 |
| KR | 2001-0083551 A | 9/2001 |
| WO | 83/01253 A1 | 4/1983 |
| WO | 96/35216 A1 | 11/1996 |
| WO | WO99/50332 | 10/1999 |
| WO | 99/65987 A1 | 12/1999 |
| WO | WO03/066704 | 8/2003 |
| WO | WO 2004106405 A1 * | 12/2004 |

OTHER PUBLICATIONS

Chemical Processing, [online]; [retrieved on Oct. 14, 2009]; retrieved from the Internet http://www.chemicalprocessing.com/industrynews/2006/056.html Article: "GE gives plastic bottle recycling a new spin," Chemical Processing.com, Aug. 26, 2006, 2pgs.

A. Pawlak et al., "Characterization of scrap poly(ethylene terephthalate)," European Polymer Journal, 2000, pp. 1875-1884, vol. 36, Elsevier Science Ltd.

* cited by examiner

ARTICLES DERIVED FROM COMPOSITIONS CONTAINING MODIFIED POLYBUTYLENE TEREPHTHALATE (PBT) RANDOM COPOLYMERS DERIVED FROM POLYETHYLENE TEREPHTHALATE (PET)

CROSS REFERENCE TO RELATED APPLICATIONS

This application claims the benefits of U.S. Provisional Patent Application Ser. No. 60/763,109 filed Jan. 27, 2006, Ser. No. 60/763,083 filed Jan. 27, 2006, Ser. No. 60/763,091 filed Jan. 27, 2006, Ser. No. 60/763,082 filed Jan. 27, 2006, and Ser. No. 60/763,107 filed Jan. 27, 2006, and Ser. No. 60/820,456, filed Jul. 26, 2006, which patent applications are fully incorporated herein by reference.

BACKGROUND OF THE INVENTION

The invention relates to the field of plastic articles.

Polyethylene terephthalate (also referred to as "PET") is a polyester of terephthalic acid and ethylene glycol that can be obtained by the polycondensation of dimethyl terephthalate with ethylene glycol, and also terephthalic acid with ethylene glycol or ethylene oxide. PET exists both as an amorphous (transparent) and as a semi-crystalline (opaque and white) thermoplastic material. Generally, it has useful chemical resistance to mineral oils, solvents and acids but not to bases. Semi-crystalline PET has good strength, ductility, stiffness and hardness. Amorphous PET has better ductility but less stiffness and hardness. PET is used to make bottles for soft drinks and other household and consumer products. Generally, PET has many uses and several large markets. For this reason, the volume of PET manufactured is large and growing.

Unfortunately, despite recycling efforts, billions of pounds of PET are still dumped into landfills annually all over the world. Other PET that is not reused is incinerated. The PET that is disposed into landfills creates significant waste. The incineration of PET also wastes a significant resource that could be used more effectively.

Articles made from thermoplastic molding compositions based on polybutylene terephthalate (also referred to as "PBT") and PBT in combination with other materials are used in various applications. Although conventional articles derived from PBT molding compositions are useful to many customers, conventional PBT-molding compositions generally cannot be made from recycle sources of PBT due to the lack of availability of large post-consumer or post-industrial PBT. PET, unlike PBT, is made in much larger quantities and is more easily recovered from consumer wastes. If PET (scrap) materials could be converted to PBT and converted into useful molding compositions, then there would exist a valuable way to effectively increase the use of scrap PET in PBT thermoplastic molding compositions and articles therefrom. If PET (scrap) materials could be converted to PBT and into useful molding compositions, then there would be an effective way to use of post consumer or post-industrial streams in PBT applications and articles. PBT made this way would conserve non-renewable hydrocarbon resources and reduce the formation of greenhouse gases, e.g., $CO_2$.

U.S. Pat. No. 5,451,611 teaches a process for converting waste poly(ethylene terephthalate) to either poly(ethylene-co-butylene terephthalate) or poly(butylene terephthalate) (PBT) by reaction with 1,4-butanediol. In discussing the prior art, U.S. Pat. No. 5,451,611 indicates that in most of the processes it cites, the undesirable byproduct diethylene glycol is formed which contaminates the final product and has to be removed by purification before the recovered products can be reused again. A principal object of U.S. Pat. No. 5,451,611 was to provide a process for converting poly(ethylene terephthalate) waste directly to another high value polymer without breaking down the poly(ethylene terephthalate) to its constituent monomers or oligomers. The patent discloses numerous examples in which a variety of polymers have a diol incorporated at various amounts. Example 11 shows a PBT polymer being formed with a complete replacement of ethylene glycol with 1,4-butanediol.

U.S. Pat. No. 5,266,601 teaches a process for making "PBT" from PET by reacting PET with 1,4-butanediol. A principal object of U.S. Pat. No. 5,266,601 was to produce PBT containing less than 1.0 wt % units of ethylene glycol from PET scrap. Another principal objective of U.S. Pat. No. 5,266,601 was to develop a process that facilitates the reduction of THF generated in the process as much as possible to the extent that this PBT is economically competitive with PBT obtained from monomers. U.S. Pat. No. 5,266,601 emphasizes the production of PBT having ethylene glycol groups in an amount that is less than 1 wt %. In the instances where compositions contain more than 1 wt %, U.S. Pat. No. 5,266,601 presents these compositions in comparative examples. Such compositions are described as having "yellowish" and "slightly yellowish" colors, respectively.

Japanese laid-open application 2005-89572 teaches a method for producing polybutylene terephthalate by transesterifying bis(2-hydroxyethyl) terephthalate with 1,4-butanediol in the presence of a transesterification reaction catalyst under the pressure of 1-54 kPa at a final temperature ranging from 200-230° C. and then subjecting the reaction product to polycondensation. In one embodiment, the bis(2-hydroxyethyl)terephthalate is obtained by depolymerizing polyethylene terephthalate with excessive ethylene glycol, and purifying the depolymerized product. The patent teaches that transesterifying bis(2-hydroxyethyl) terephthalate with 1,4-butanediol under reduced pressure imparts favorable results.

Although such documents disclose ways of using PET scrap, such documents do not meet the long felt need of using PET scrap that is ordinarily incinerated or buried in landfills in molding compositions or articles made from molding compositions. U.S. Pat. No. 5,451,611, for instance, does not teach effective processes that enable PET to be able to be broken down into its constituent monomers or oligomers—a feature that is sometimes required by commercial considerations. U.S. Pat. No. 5,451,611 does not provide meaningful guidelines for making compositions functionally similar to PBT containing ethylene glycol in amounts other than trace amounts and which exhibit melting temperatures that are higher than those shown in its examples. Similarly, U.S. Pat. No. 5,266,601 does not provide meaningful details about how to make molding compositions containing fillers, other materials such as flame retardants, impact modifiers, epoxies, polyester resins such as PET, polytrimethylene terephthalate and polycarbonates, and PBT with a PET residue such as ethylene glycol in any amount, let alone an amount that is more than 1 wt %. In fact, neither patent discusses if or how the materials they describe can be used in molding compositions containing fillers and other materials such as flame retardants, impact modifiers, epoxies, polyesters and polycarbonates. Japanese laid-open application 2005-89572 is also silent about PBT molding compositions as well as methods for utilizing PET effectively to make such compositions.

Known technology relating to utilizing PET as scrap materials for making PBT-like materials does not provide meaningful solutions that solve the long felt need to increase the use of PET scrap that is ordinarily incinerated or buried in landfills. Known technology does not provide meaningful solutions that solve the long felt need for PBT thermoplastic compositions from PBT derived from PET that exhibit a combination of physical properties that are highly useful in compositions and articles that are valued by customers.

For the foregoing reasons, there is a need to develop new articles made from molding compositions that utilize PBT derived from post consumer and post industrial PET and that have useful performance properties.

For the foregoing reasons, there is a need to develop new articles made from molding compositions that reduce the usage of non-renewable hydrocarbon resources and the amount of $CO_2$ emissions generated per unit of PBT.

For the foregoing reasons, there is a need to develop new processes for making articles from molding compositions that utilize PBT derived from PET and that have useful performance properties.

BRIEF DESCRIPTION OF THE INVENTION

The invention relates to a composition of matter comprising an article derived from a composition containing:

(a) from 5 to 99.99 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and (b) from 0.01 to 95 wt. % of a member selected from the group consisting of (1) fillers, (2) carboxy reactive materials (3) polyalkylene terephthalates, (4) combinations of polycarbonates and impact modifiers, (5) impact modifiers, (6) polycarbonates, and (7) combinations thereof;

wherein the modified polybutylene terephthalate random copolymer, the member selected from the group consisting of (1) fillers, (2) carboxy reactive materials (3) polyalkylene terephthalates, (4) combinations of polycarbonates and impact modifiers, (5) impact modifiers, (6) polycarbonates, and (7) combinations thereof, and optionally at least one additive, are present in a total amount of 100 wt %.

In another embodiment, the invention relates to a composition of matter comprising an article containing:

(a) from 5 to 99.99 wt % of a modified polybutylene terephthalate random copolymer that (1) is derived from polyethylene terephthalate and (2) contains at least one residue derived from polyethylene terepthalate selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, alkali salts, alkaline earth metal salts, phosphorous-containing compounds and anions, sulfur-containing compounds and anions, napthalene dicarboxylic acids, 1,3-propanediol groups, and combinations thereof.

(b) from 0.01 to 95 wt. % of a member selected from the group consisting of (1) fillers, (2) carboxy reactive component, (3) polyethyelene terephthalate, (4) a component including a polycarbonate and an impact modifier, (5) impact modifiers, and (6) polycarbonates, and (7) combinations thereof;

wherein the residue derived from the polyethylene terephthalate component is selected from the group consisting of ethylene glycol groups, diethylene glycol groups, and cyclohexane dimethanol groups and the residue is in an amount ranging from 0.1 to 10 mole %, based on 100 mole % of glycol the molding composition; and wherein the modified polybutylene terephthalate random copolymer, the member selected from the group consisting of (1) fillers, (2) carboxy reactive component, (3) polyethyelene terephthalate, (4) a component including a polycarbonate and an impact modifier, (5) impact modifiers, and (6) polycarbonates, and (7) combinations thereof, and optionally at least one additive, are present in a total amount of 100 wt %

In another embodiment, the invention relates to a composition of matter comprising an article containing:

(a) from 5 to 99.99 wt % of a modified polybutylene terephthalate random copolymer that (1) is derived from polyethylene terephthalate and (2) contains at least one residue derived from polyethylene terepthalate selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, alkali salts, alkaline earth metal salts, phosphorous-containing compounds and anions, sulfur-containing compounds and anions, napthalene dicarboxylic acids, 1,3-propanediol groups, and combinations thereof.

(b) from 0.01 to 95 wt. % of a member selected from the group consisting of (1) fillers, (2) a carboxy reactive component, (3) polyethyelene terephthalate, (4) a component including a polycarbonate and an impact modifier, (5) impact modifiers, and (6) polycarbonates, and (7) combinations thereof;

wherein the residue derived from the polyethylene terephthalate component is selected from the group consisting of ethylene glycol groups, diethylene glycol groups, and cyclohexane dimethanol groups and the residue is in an amount ranging from 0.1 to 10 mole %, based on 100 mole % of glycol the molding composition.

The article can be selected from the group consisting of injection molded articles, thermoformed articles, vacuum forming, extruded articles, pultruded articles, rotationally molded articles, melt blown articles, spunbond articles, woven and non-woven articles, and blow molded articles.

The articles may also be derived from various conversion processes, e.g., injection molding processes, extrusion processes, thermoforming processes, vacuum forming and rotational molding process. Articles may additionally be made in the form of fibers from melt blown, melt spun, spunbond, wovens, non-wovens, monofilament and multifilament extrusion.

These and other features, aspects, and advantages of the present invention will become better understood with reference to the following description and appended claims.

DESCRIPTION OF THE FIGURES

These and other features, aspects, and advantages of the present invention will become better understood with reference to the following description and appended claims, where:

DETAILED DESCRIPTION OF THE INVENTION

Figure 1:
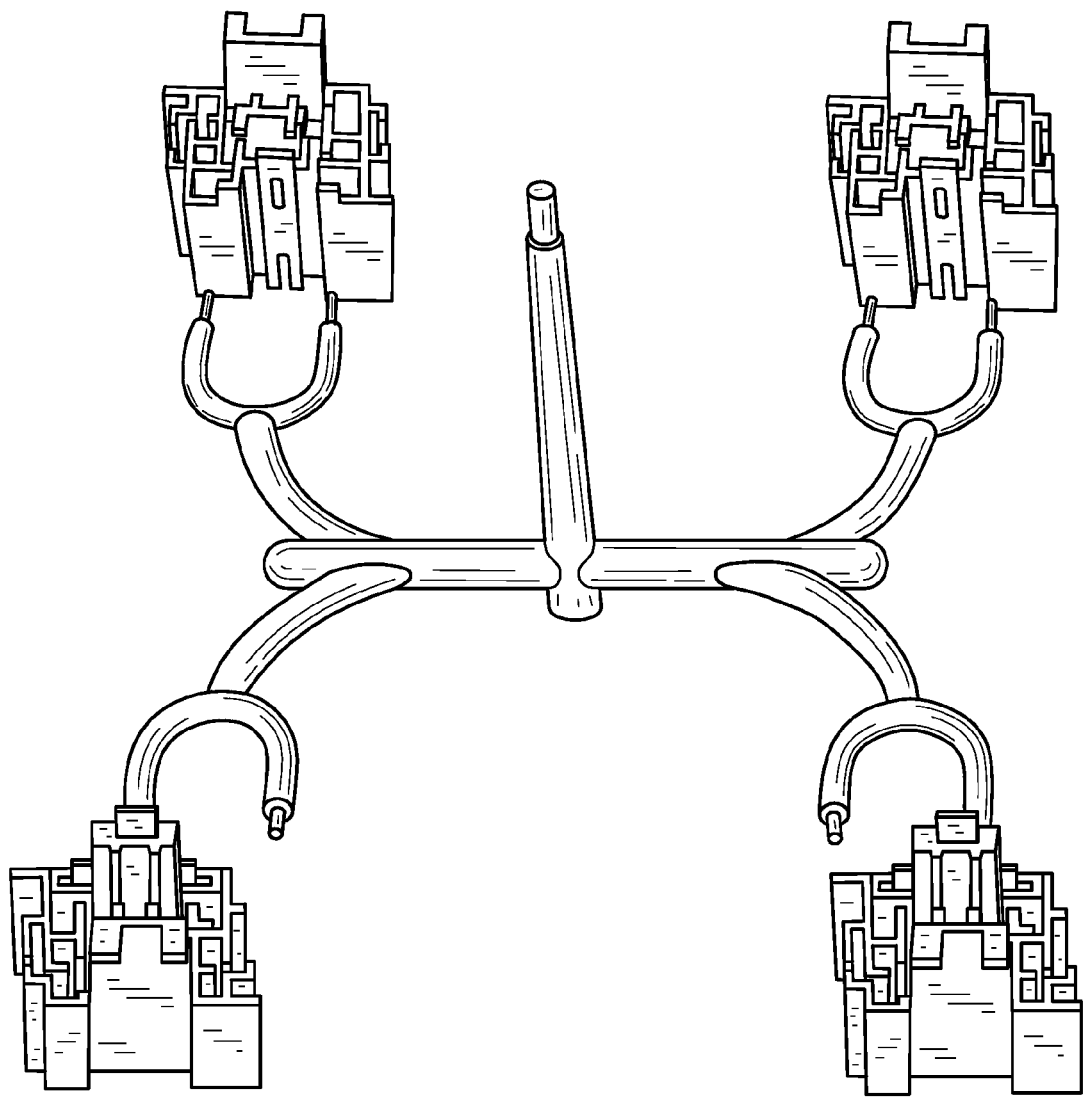
FIG. 1 is frontal view of connectors made in accordance to an embodiment of the invention.

The invention is based on the remarkable discovery that it is now possible to make an article with useful physical properties, suitable in commercial applications, which contains a modified-PBT component derived from poly(ethylene terephthalate), e.g., used PET soft drink bottles. Unlike conventional articles that are made from molding compositions containing virgin PBT (PBT that is derived from monomers), the modified-PBT component used in the articles contains polyethylene terephthlate residues, e.g., materials such as ethylene glycol and isophthalic acid groups (components that are not present in "virgin," monomer-based PBT). Advantageously, despite using a PBT that is structurally different from virgin PBT, our articles exhibit similar performance properties as articles made from molding compositions containing monomer-based PBT.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All molecular weights in this application refer to number average molecular weight obtained with the polystyrene standard. Details of the technique include the following items: (i) Instrument: Waters 2695 separation module; (ii) Detector: Waters 2487 Dual Absorbance Ultraviolet Detector @273 and 295 nanometers and Water 410 refractomer; (iii) Mobile phase: 5% HFIP 95% chloroform; (iv) GPC columns: Polymer Labs PL HFIPgel 250×4.6 mm, (v) Flow rate: 0.3 ml/min; (vi) Injection volume 10 μl; (vii) Polystyrene standards: Polymer Lab's Easical PS-1, 580-7,500,000 Da.

Unless otherwise state the following terms have the respective meanings indicated. For the sake of clarity, the terms terephthalic acid group, isophthalic acid group, butanediol group, ethylene glycol group in formulas have the following meanings. The term "terephthalic acid group" (R') in a composition refers to a divalent 1,4-benzene radical (-1,4-($C_6H_4$)—) remaining after removal of the carboxylic groups from terephthalic acid-. The term "isophthalic acid group" (R") refers to a divalent 1,3-benzene radical (-(-1,3-$C_6H_4$)—) remaining after removal of the carboxylic groups from isophthalic acid. The "butanediol group" (D) refers to a divalent butylene radical (—($C_4H_8$)—) remaining after removal of hydroxyl groups from butanediol. The term "ethylene glycol group" (D') refers to a divalent ethylene radical (—($C_2H_4$)—) remaining after removal of hydroxyl groups from ethylene glycol -). With respect to the terms "isophthalic acid group," "ethylene glycol group," and "diethylene glycol group" being used in other contexts, e.g., to indicate the weight % of the group in a composition, the term "isophthalic acid group(s)" means the group having the formula (—O(CO)$C_6H_4$(CO)—), the term "terephthalic acid group(s)" means the group having the formula (—O(CO)$C_6H_4$(CO)—), the term diethylene glycol group means the group having (—O($C_2H_4$)O($C_2H_4$)—), the term "butanediol group(s)" means the group having the formula (—O($C_4H_8$)—), and the term "ethylene glycol groups(s)" means the group having formula (—O($C_2H_4$)—).

The term "random copolymer," as used in this application refers to a copolymer that includes macromolecules in which the probability of finding a given monomeric unit at any given site in the chain is independent of the nature of the adjacent units.

An embodiment of the invention relates to a composition of matter comprising an article derived from a molding composition containing:

(a) from 5 to 99.99 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and (b) from 0.01 to 95 wt. % of a member selected from the group consisting of (1) fillers, (2) carboxy reactive materials (3) polyalkylene terephthalates, (4) polycarbonates and an impact modifiers, (5) impact modifiers, (6) polycarbonates, and (7) combinations thereof.

The modified polybutylene terephthalate component derived from polyethylene terephthalate (PET-derived modified PBT component) is (1) is derived from polyethylene terephthalate component selected from the group consisting of polyethylene terephthalate and polyethylene terephthalate copolymers and (2) has at least one residue derived from the polyethylene terephthalate component. In one embodiment, the modified polybutylene terephthalate component can further be derived from a biomass-derived 1,4-butanediol, e.g. corn derived 1,4-butanediol or a 1,4-butane-diol derived from a cellulosic material.

The residue derived from the polyethylene terephthalate component, which is present in the modified polybutylene terephthalate component can be selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, alkali salts, alkaline earth metal salts, e.g., calcium, magnesium, sodium and potassium salts, phosphorous-containing compounds and anions, sulfur-containing compounds and anions, napthalene dicarboxylic acids, 1,3-propanediol groups, and combinations thereof.

Depending on factors such as polyethylene terephthalate and polyethylene terephthalate copolymers, the residue can include various combinations. In one embodiment, for instance, the residue includes mixtures of ethylene glycol and diethylene glycol. In another embodiment, the residue includes mixtures of ethylene glycol and diethylene glycol and isophthalic acid. In another embodiment, the residue derived from polyethylene tereptphalate further includes cis isomer of 1,3-cyclohexane dimethanol, 1,4-cyclohexane dimethanol, trans isomer of 1,-3 cyclohexane dimethanol, trans isomer of 1,4 cyclohexane dimethanol and combinations thereof. In another embodiment, the residue includes cis isomer of 1,3-cyclohexane dimethanol, 1,4-cyclohexane dimethanol, trans isomer of 1,-3 cyclohexane dimethanol, trans isomer of 1,4 cyclohexane dimethanol and combinations thereof. And in another embodiment, the residue can be a mixture of ethylene glycol, diethylene glycol, isophthalic acid groups, cis isomer of cyclohexane dimethanol, trans isomer of cyclohexane dimethanol, and combinations thereof. In one embodiment, the residue derived from polyethylene terephthalate includes mixtures of ethylene glycol, diethylene glycol, and cobalt-containing compounds. Such cobalt-containing compound mixture can also contain isophthalic acid groups.

In one embodiment, for instance, the modified polybutylene terephthalate component derived from polyethylene terephthalate (PET-derived modified PBT component, or modified polybutylene terephthalate copolymers containing residues derived from polyethylene terephthalate) that is made by the process of the invention is a random copolymer containing groups selected from the following groups:

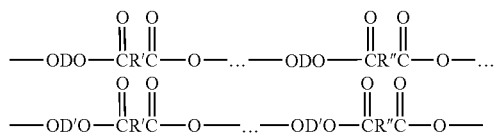

where R' is a terephthalic acid group (-1,4-$(C_6H_4)$—group)
R" is—an isophthalic acid group (1,3-$(C_6H_4)$—)
D is butanediol group (—$(C_4H_8)$—)
D' is ethylene glycol group (—$(C_2H_4)$—)

The modified polybutylene terephthalate copolymers containing residues derived from polyethylene terephthalate can also contain diethylene glycol groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mole % and can range from 0 or 0.1 to 10 mole % (0 or 0.07 to 7 wt. %). The PET-derived modified PBT component ordinarily contains ethylene glycol in an amount that is at least 0.1 mole % and can range from 0.1 to 10 mole % (0.02 to 2 wt. %). In one embodiment, the PET-derived modified PBT component has an ethylene glycol content that is more than 0.85 wt. %. The modified PBT component can also contain diethylene glycol in an amount ranging from 0.1 to 10 mole % (0.04 to 4 wt. %). The amount of the butanediol groups is generally about 98 mole % and can vary from 95 to 99.8 mole % in some embodiments. The amount of the terephthalic acid groups is generally about 98 mole % and can vary from 90 to 99.9 mole % in some embodiments.

Unless otherwise specified, all molar amounts of the isophthalic acid groups and or terephthalic acid groups are based on the total moles of diacids/diesters in the composition. Unless otherwise specified, all molar amounts of the butanediol, ethylene glycol, and diethylene glycol groups are based on the total moles of diol in the composition. The weight percent measurements stated above are based on the way terephthalic acid groups, isophthalic acid groups, ethylene glycol groups, and diethylene glycol groups have been defined herein.

The total amount of materials of the polyethylene terephthalate component residue in the modified polybutylene random copolymer can vary. For instance, mixtures can be in an amount ranging from 1.8 to 2.5 wt. %, or from 0.5 to 2 wt. %, or from 1 to 4 wt. %. The ethylene glycol, diethylene glycol, and cyclohexane dimethanol groups can be individually or in combination present in an amount ranging from 0.1 to 10 mole %, based on 100 mole % of glycol the molding composition. The isophthalic acid groups can be present in an amount ranging from 0.1 to 10 mole %, based on 100 mole % of diacid/diester in the molding composition.

It has been discovered that when it is desirable to make a polybutylene terephthalate copolymers having a melting temperature Tm that is at least 200° C., the total amount of diethylene glycol, ethylene glycol, and isophthalic acid groups should be within a certain range. As such, in one embodiment, the total amount of the diethylene glycol, ethylene glycol, and isophthalic acid groups in the modified polybutylene terephthalate component is more than 0 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 10 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 10 and less than or equal to 23 equivalents, relative to the total of 100 equivalents of diol and 100 equivalents of diacid groups in the modified polybutylene terephthalate random copolymer. In one embodiment, diethylene glycol, ethylene glycol and/or isophthalic acid can be added during the process.

The total ethylene glycol groups, isophthalic acid groups, and diethylene glycol groups can vary, depending on the application and the user's needs. In one embodiment, the molding composition can have total monomer content selected from the group consisting of ethylene glycol, isophthalic acid groups, and diethylene glycol groups in an amount ranging from more than 0 and less than or equal to 17 equivalents relative to the total of 100 equivalents of diol and 100 equivalents of diacid groups in the modified polybutylene terepthalate random copolymer. Advantageously, such compositions can maintain useful properties, such as heat deflection temperatures that are more than 180° C.

It has also been discovered that the total amount of inorganic residues derived from the polyethylene terephthalate can be present from more than 0 ppm and up to 1000 ppm. Examples of such inorganic residues can be selected from the group consisting of antimony-containing compounds, germanium-containing compounds, titanium-containing compounds, cobalt-containing compounds, tin containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. In another embodiment, the amounts of inorganic residues can range from 250 to 1000 ppm. In another embodiment, the amounts of inorganic residues can range from 500 to 1000 ppm.

The PET component from which the modified polybutylene terephthalate random copolymer is made can be in any form that can be used according to our invention. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid and other contaminants. Also, the PET component can include PET that is not waste in flake, chip or pellet form. As such, PET that would ordinarily be deposited in landfills can now be used productively and effectively. In one embodiment, PET component can also include other polyesters. The PET component can also include polyester copolymers. Examples of such materials include polyalkylene terephthalates that can be selected from polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polybutylene terephthalate, poly-xylylene terephthalate, polydianol terephthalates, polybutylene terephthalate, polytrimethylene terephthalate, polyester naphthalates, and combinations thereof.

A modified polybutylene terephthalate random copolymer derived from the polyethylene terephthalate component can be derived from a polyethylene terephthalate component by any method that involves depolymerization of a polyethylene terephthalate component and polymerization of the depolymerized polyethylene terephthalate component with 1,4-butanediol into the modified polybutylene terephthalate random copolymer. For instance, the modified polybutylene terephthalate component derived from the polyethylene terephthalate component can be made by a process that involves depolymerizing a polyethylene terephthalate component selected from the group consisting of polyethylene terephthalate and polyethylene terephthalate copolymers with a 1,4-butanediol component at a temperature ranging from 180° C. to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof; and agitating the molten mixture at subatmospheric pressure and increasing the temperature of the molten mixture to an elevated temperature under conditions sufficient to form a modified random polybutylene terephthalate copolymer containing at least one residue derived from the polyethylene terephthalate component.

Polyester moieties and the 1,4-butanediol are combined in the liquid phase under agitation and the 1,4-butanediol can be continuously refluxed back into the reactor during step (a). The THF and water formed in the stage can be removed by distillation or partial condensation.

The polyethylene terephthalate component and the 1,4-butanediol component are generally combined under atmospheric pressure. In another embodiment of the invention, however, it is possible to use pressures that are higher than atmospheric pressures. For instance, in one embodiment, the pressure at which the polyethylene terephthalate component and the 1,4-butanediol are subjected to is 2 atmospheres, or higher. For higher pressures, the reaction mixtures can be depolymerized at temperatures higher than 230° C.

The temperature at which the polyethylene terephthalate component and the 1,4-butanediol component are combined and reacted is sufficient to promote depolymerization of the polyethylene terephthalate component into a mixture of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof. The temperature at which the polyethylene terephthalate component and the 1,4-butanediol component are combined generally ranges from 180° C. to 230° C. 1,4-butanediol is generally used in excess amount relative to the polyethylene terephthalate component. In one embodiment, 1,4-butanediol is used in a molar excess amount ranging from 2 to 20.

During the initial stage of the process when the polyethylene terephthalate component and the 1,4-butanediol are combined and react ("step (a)"), the polyethylene terephthalate component and the 1,4-butanediol depolymerize into a molten mixture at a pressure that is at least atmospheric pressure suitable conditions. 1,4-butanediol, ethylene glycol, are generally recirculated, and tetrahydrofuran is distilled during "step (a)" of the process. The molten mixture contains oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof.

The duration of the step in which polyethylene terephthalate component reacts with 1,4-butanediol can vary, depending on factors, such as available equipment, production needs, desired final properties, and the like. In one embodiment, this step is carried out in at least 2 hours. In another embodiment, the step is carried out from 2 to 5 hours.

The process further includes the step of subjecting the molten mixture to subatmospheric pressure and increasing the temperature of the molten mixture to a temperature ranging from 240° C. to 260° C., and thereby forming the modified polybutylene terephthalate component derived from the polyethylene terephthalate component.

Excess butanediol, ethylene glycol, and tetrahydrofuran (THF) are preferably removed and step (b) is carried out under agitation. The molten mixture, when placed in subatmospheric pressure conditions at a suitable temperature for a sufficiently long time period, polymerizes into a modified polybutylene terephthalate component derived from the polyethylene terephthalate component random copolymer.

Generally, the molten mixture pressure is subjected to a pressure ranging from subatmospheric to less than 1 Torr. In one embodiment, the pressure is reduced to a pressure ranging from 100 to 0.05 Torr in a continuous manner. In another embodiment, the pressure is reduced to a pressure ranging from 10 to 0.1 Torr in a continuous fashion.

Advantageously, the molten mixture can be placed under subatmospheric conditions without isolation and dissolution of any material from the molten mixture. The avoidance of this step greatly enhances the utility of the process.

During the step when the molten mixture is placed under subatmospheric conditions and the temperature is increased, excess butanediol, ethylene glycol and THF are removed from the reactor and oligomers are allowed to build in molecular weight. Agitation can be continuously provided to facilitate the removal of the low boiling components and allow the molecular weight buildup of the polymer. After sufficient molecular weight is obtained, the resulting molten PBT polymer is cast from the reactor through a diehead, cooled with water, stranded and chopped into pellets.

The duration of the step (step (b) discussed above) in which the molten mixture polymerizes from polyethylene terephthalate and poly(butylene terephthlate) oligomers, 1,4, butanediol, and ethylene glycol can vary, depending on factors, such as equipment available, production needs, desired final properties, and the like. In one embodiment, this step is carried out in at least two hours. In another embodiment, the step is carried out from 2 to 5 hours.

The temperature at which the molten mixture is placed under subatmospheric conditions is sufficiently high to promote polymerization of the polyethylene terephthalate and poly(butylene terephthlate) oligomers, 1,4,-butanediol, and ethylene glycol to the modified polybutylene terephthalate component derived from the polyethylene terephthalate component. Generally, the temperature is at least 230° C. In one embodiment, the temperature ranges from 250° C. to 275° C.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors.

The catalyst component that is used to facilitate the reaction of the process generally includes a catalyst that facilitates the reaction. The catalyst can be selected from antimony compounds, tin compounds, titanium compounds, combinations thereof as well as many other metal catalysts and combinations of metal catalysts that have been disclosed in the literature. The amount of the catalyst will vary on the specific need at hand. Suitable amounts of the catalyst range from 1 to 5000 ppm, or more.

The catalyst component is generally added during the step when the polyethylene terephthalate component initially combines with the 1,4-butanediol. In another embodiment, however, the catalyst component may be added to the molten mixture that forms after the polyethylene terephthalate component and the 1,4-butanediol component are combined.

The process for making the modified polybutylene terephthalate component derived from the polyethylene terephthalate component is preferably carried out under agitative conditions. The term "agitative conditions" or "agitation" refers to subjecting the polyethylene terephthalate component and the 1,4-butanediol or the molten mixture to conditions that involve physically mixing the polyethylene terephthalate component 1,4-butanediol or molten mixture under conditions that promote the depolymerization of the PET when the agitative conditions are applied to polyethylene terephthalate component 1,4-butanediol "step (a)", or the polymerization of the PBT from polyethylene terephthalate oligomers, 1,4-butanediol, and ethylene glycol "step (b)." The physical mixing can be accomplished by any suitable way. In one embodiment, a mixer containing rotating shaft and blades that are perpendicular to the shaft can be used.

The process for making the modified polybutylene terephthalate component derived from the polyethylene terephthalate component can include a step that reduces the amount of THF produced during the process by adding a basic compound containing an alkali metal to the reactor in step (a) and thereby reducing formation of THF.

The basic compound contains an alkali metal and can be selected from one or more of the following compounds sodium alkoxides, sodium hydroxide, sodium acetate, sodium carbonate, sodium bicarbonates, potassium alkoxides, potassium hydroxide, potassium acetate, potassium carbonate, potassium bicarbonate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminium alkoxides, aluminium hydroxide, aluminium acetate, aluminium carbonate, aluminium bicarbonates, and combinations thereof.

The amount of the basic compound added to a mixture is generally at least 0.1 ppm. In one embodiment, the amount of the basic compound is from 0.1 to 50 ppm. In another embodiment, the amount of the basic compound ranges from 1 to 10 ppm.

The addition of the basic compound containing an alkali metal can reduce the amount of total THF production, as compared to when the process is carried out without the basic compound. In one embodiment, the total THF produced during the process is reduced by at least 10%, as compared to a process that does not use the basic compound. In another embodiment, the total THF produced during the process is reduced ranges from at least 10% to 50%, or more.

In another embodiment, a difunctional epoxy compound can be added to reduce the formation of THF. The epoxy compounds may be selected from the group of difunctional epoxies. Examples of suitable difunctional epoxy compounds include and are not limited to difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate. The amount of the epoxy that may be added to the mixture is generally at least 0.05 wt. %. In one embodiment, the amount of the epoxy compound is from 0.1 to 1 wt. %. In another embodiment, the amount of the epoxy compound was 0.2 to 0.5 wt. %. In one embodiment, the invention provides an additional embodiment in which THF production is reduced by a process that involves the steps of:

(a) reacting (i) a polyethylene terephthalate component selected from the group consisting of polyethylene terephthalate and polyethylene terephthalate copolymers with a diol component selected from the group consisting of ethylene glycol, propylene glycol, and combinations thereof, in a reactor at a pressure that is at least atmospheric pressure in the presence of a catalyst component at a temperature ranging from 190° C. to 250° C., under an inert atmosphere, under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the polyethylene terephthalate component and the diol component are combined under agitation;

(b) adding 1,4-butanediol to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (c) increasing the temperature of the second molten mixture under subatmospheric conditions and agitation to a temperature from 240° C. to 260° C., thereby forming a modified random polybutylene terephthalate copolymer containing at least one residue derived from the polyethylene terepthalate component.

This three-step embodiment provides an additional advantageous way for producing modified PBT random copolymers from PET. The diol component used in step (a) f of the three-step embodiment can be selected from ethylene glycol, propylene glycol, and combinations thereof. The diol component can be present in step (a) at a molar amount that is at least half the amount of ethylene glycol moieties present in the polyethylene terephthalate component. The depolymerization of the polyethylene terephthalate component can be carried out for various times. In one embodiment, the depolymerization is carried out for at least 25 minutes.

The 1,4-butanediol used during step (b) of the three-step embodiment can be added at a molar amount that is in excess relative to the molar amount of butanediol moieties incorporated into the modified polybutylene terephthalate random copolymer component obtained in step (c).

During the process the compounds used in the process can be reused and/or collected. In one embodiment, the diol component selected from the group consisting of ethylene glycol, propylene glycol, and combinations thereof and (2) 1,4-butanediol are removed and collected in a vessel in step (b). In another embodiment, in step (b), 1,4-butanediol is refluxed back into the reactor and a component selected from the group of excess butanediol, ethylene glycol, propylene glycol, tetrahydrofuran, and combinations thereof is removed. Step (b) is practiced for a sufficient period of time to reduce at least 65% of ethylene glycol from the second molten mixture. The duration of step (b) can also vary. In one embodiment, step (b) lasts at least 45 minutes. The pressure at which step (b) is carried out can vary. In one embodiment, step (b) is carried out in atmospheric conditions. In another embodiment, step (b) is carried out in subatmospheric conditions. Different combinations are possible. In one embodiment, step (b) is carried out with excess 1,4-butanediol and at a pressure ranging from 300 to 1500 mbar absolute. In another embodiment, 1,4-butanediol is used in a molar excess amount ranging from 1.1 to 5.

Step (c) of the three-step embodiment can also be carried out with modifications, depending on the application. In one embodiment, for instance, a component selected from the group of excess butanediol, ethylene glycol, propylene glycol, tetrahydrofuran, and combinations thereof is removed during step (c). The pressure at which step (c) is carried out can also vary. In one embodiment, step (c) is carried out at a pressure that is less than 10 mbar. The three-step process can be carried out in the same reactor. Alternatively, the three-step process can be carried out in at least two reactors.

In another embodiment, the three-step process can include the step of adding a basic compound during step (a), step (b), step (c), and combinations thereof, and thereby further reduce THF production. The basic compound, as in the two-step embodiment, can contain those compounds mentioned above. Alternatively, difunctional epoxy compounds can be added during step (b) in the amounts indicated above.

Advantageously the three-step process can reduce tetrahydrofuran by an amount that is at least 30% as compared to the amount of tetrahydrofuran produced by a process that depolymerizes polyethylene terephthalate component with 1,4-butanediol instead of the diol component selected from the group consisting of ethylene glycol, propylene glycol, and combinations thereof.

The process for making the modified polybutylene terephthalate component derived from the polyethylene terephthalate component may contain an additional step in which the PBT formed from the molten mixture is subjected to solid-state polymerization. Solid-state polymerization generally involves subjecting the PBT formed from the molten mixture to an inert atmosphere or subatmospheric pressure and heating to a temperature for a sufficient period of time to build the molecular weight of the PBT. Generally, the temperature to which the PBT is heated is below the melting point of the PBT, e.g., from 5° C. to 60° C. below the melting point of the PBT. In one embodiment, such a temperature may range from 150° C. to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the PBT to a suitable molecular weight. Such tumultuous conditions may be created by subjecting the PBT to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar.

Our invention includes an embodiment in which the 1,4-butanediol can be derived from biomass. The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based butanediol can be obtained from several sources. For instance, the following process can be used to obtain biomass-based 1,4-butanediol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butanediol by processes described in several published documents such as in U.S. Pat. No. 4,096,156, incorporated herein in its entirety. Bio-mass derived-1,4-butanediol can also be converted to tetrahydrofuran, and further converted to polytetrahydrofuran, also known as polybutylene oxide glycol. Another process that describes converting succinic acid into 1,4-butanediol is described in Life Cycles Engineering Guidelines, by Smith et al., as described in EPA publication EPA/600/R-1/101 (2001).

The amount of the modified polybutylene terephthalate random copolymer can vary, depending on the composition and the article needs of an application. Generally, the modified polybutylene terephthalate is present in an amount ranging from 5 to 99.99 wt %.

In one embodiment, when the modified polybutylene terephthalate random copolymer is used in conjunction with polycarbonate and an impact modifier; the polybutylene terephthalate random copolymer is present in an amount ranging from 5 to 90 wt. %, the polycarbonate is present in an amount ranging from 5 to 90 wt. %; and the impact modifier is present in an amount that is at least 1 wt. %; wherein the combined wt. % of the polycarbonate and the impact modifier, the polybutylene terephthalate random copolymer, and optionally, at least one additive, is 100 wt %.

The filler component of the molding compositions used to make our articles generally includes inorganic fillers to the thermoplastic resin provide higher tensile modulus, density and low coefficient of thermal expansion without deleteriously affecting the other favorable properties. Examples of suitable inorganic fillers include: alumina, amorphous silica, anhydrous alumino silicates, mica, wollastonite, barium sulfate, zinc sulfide, clays, talc, metal oxides such as titanium dioxide. Low levels (0.1-10.0 wt. %) of very small particle size (largest particles less than 10 microns in diameter) are useful in one embodiment. In one embodiment, the filler are present in an amount that is at least 1 wt %, and the fillers are selected from the group consisting of glass fillers, ceramic fillers, carbon fillers, nano-fillers, nano-tubes, nano-composites, and combinations thereof.

A particularly suitable embodiment of fillers includes reinforcing fibers such as glass, ceramic and carbon and are generally well known in the art, as are their methods of manufacture. In one embodiment, glass is particularly suitable, especially glass that is relatively soda free. Fibrous glass filaments comprised of lime-alumino-borosilicate glass, which is also known as "E" glass are often especially suitable. Glass fiber is added to the composition to increase the flexural modulus and strength. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns are required with a diameter of from 10-15 microns being preferred. In preparing the molding compositions it is convenient to use the fiber in the form of chopped strands of from about ⅛" (3 mm) to about ½" (13 mm) long although roving may also be used. In articles molded from the compositions, the fiber length is typically shorter presumably due to fiber fragmentation during compounding of the composition. The length of such short glass fibers present in final molded compositions is less than about 4 mm. The fibers may be treated with a variety of coupling agents to improve adhesion to the resin matrix. Preferred coupling agents include; amino, epoxy, amide or mercapto functionalized silanes. Organo metallic coupling agents, for example, titanium or zirconium based organo metallic compounds, may also be used.

Other preferred sizing-coated glass fibers are commercially available from Owens Corning Fiberglass as, for example, OCF K filament glass fiber 183F.

In another embodiment, long glass fibers can be used, wherein a continuous glass fiber bundle containing glass fiber monofilaments having a diameter in the range, 10-24 μm, preferably 13-18 μm is impregnated with a melted thermoplastic preferably a polyester. After cooling, the impregnated bundle is cut into pellets having a length of >5 mm, preferably, above >9 mm. For impregnation, a high flow polyester of the present invention can be used in order to improve the wetting rate of the filaments to make long glass fiber pellets. These pellets can be incorporated into the polyester compositions of the invention, to get long fiber glass reinforced polyester compositions. The length of long glass fiber present in molded composition prepared by this method is typically greater than that prepared by incorporation of short fibers and the predominant portion of the long glass fibers present have a length>4 mm in the molded part. Such long fiber glass reinforced compositions can be used for different molding techniques such as injection molding, compression molding, thermoforming and the like. As in the case of short fibers, the long fibers may also be treated with a variety of coupling agents to improve adhesion to resin. For those skilled in the art, a continuous process such as pultrusion technique for direct incorporation of long glass fibers in high flow polyester compositions will also be possible.

Additionally PET-derived PBT can be incorporated into chopped strands of glass as a powder in a papermaking process. PET-derived PBT can be incorporated into continuous glass tapes through a pultrusion or a powder incorporation method or through a rod or shape pultrusion process.

Other fillers and reinforcing agents may be used alone or in combination with reinforcing fibers. These include but are not limited to: carbon fibrils, mica, talc, barytes, calcium carbonate, wollastonite, milled glass, flaked glass, ground quartz, silica, zeolites, and solid or hollow glass beads or spheres, polyester fibers or aramid fibers.

The glass fibers may be blended first with the PET-derived PBT component and then fed to an extruder and the extrudate cut into pellets, or, in a preferred embodiment, they may be separately fed to the feed hopper of an extruder. In a highly suitable embodiment, the glass fibers may be fed downstream in the extruder to minimize attrition of the glass. Generally, for preparing pellets of the composition set forth herein, the extruder is maintained at a temperature of approximately 480 F to 550° F. The pellets so prepared when cutting the extrudate may be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In one embodiment, the filler component includes nanofillers. Suitable nanofillers can include silicates, generally clays, in particular phyllosilicates such as montmorillonite, nontronite, beidelite, volkonskoite, hectorite, saponite, sauconite, magadiite, medmontite, fluorohectorite, vermiculite, kaolinite. Clays, in particular phyllosilicates, which have a lamellar structure, contain for example alkali cations such as $K^+$ or $Na^+$ or alkaline-earth cations or even organic cations such as alkylammonium or alkylsulphonium ions, obtained by ion exchange reactions, between their lamellae. Other nanoparticle includes, nano particles of metal oxides such as titanium oxides, silicon oxides, and the like.

The fillers can include organic fibers. Organic fibers include and are not limited to synthetic polymer fibers such as polyamides, e.g., Kevlar™ fibers, or natural fibers. Examples of suitable fibers include coconut fibers, jute fibers, flax fibers, and naturally occurring cellulosic fibers. These fibers can be used individually or in combination with other fibers or other filler described herein. Since natural fibers are derived from biomass, such as plant sources, such a feature is attractive to some customers who are increasingly interested in using such materials. Also, the use of organic or natural fibers generally result in parts having a relative low densities and relatively lower weights.

The amount of the filler component in a composition used to make an article is generally at least 1 wt. %. In one embodiment, the amount of the filler component ranges from 5 wt. % to 70 wt %. In another embodiment, the amount of the filler component ranges from 30 to 50 wt. %. When organic fibers are used as fillers, the amount of organic fibers can range from 1 to 50 wt %.

The amount of the filler component in a composition used to make an article is generally at least 1 wt. %. In one embodiment, for instance, the fillers are present in an amount that is at least 1 wt. %, and the fillers are selected from the group consisting of glass fillers, ceramic fillers, carbon fillers, metal fillers, mineral fillers, nano-fillers, nano-tubes, talc, and combinations thereof. In another embodiment, the fillers are nanotubes and the nanotubes are present in an amount that is less than 1 wt. %. In one embodiment, the amount of the filler component ranges from 5 wt. % to 70 wt. %. In another embodiment, the amount of the filler component ranges from 30 to 50 wt. %. An artisan, however, will appreciate the amounts for specific materials can vary, depending on the embodiments. Low levels, e.g., from 0.1 to 10.0 wt. % of fillers having a very small particle size (where largest particles are less than 10 microns in diameter) are useful in one embodiment.

The carboxy-reactive material is a monofunctional or a polyfunctional carboxy-reactive material that can be either polymeric or non-polymeric. Examples of carboxy-reactive groups include epoxides, carbodiimides, orthoesters, oxazolines, oxiranes, aziridines, and anhydrides. The carboxy-reactive material can also include other functionalities that are either reactive or non-reactive under the described processing conditions. Non-limiting examples of reactive moieties include reactive silicon-containing materials, for example epoxy-modified silicone and silane monomers and polymers. If desired, a catalyst or co-catalyst system can be used to accelerate the reaction between the carboxy-reactive material and the polyester.

The term "polyfunctional" or "multifunctional" in connection with the carboxy-reactive material means that at least two carboxy-reactive groups are present in each molecule of the material. Particularly useful polyfunctional carboxy-reactive materials include materials with at least two reactive epoxy groups. The polyfunctional epoxy material can contain aromatic and/or aliphatic residues. Examples include epoxy novolac resins, epoxidized vegetable (e.g., soybean, linseed) oils, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

In one embodiment, the polyfunctional carboxy-reactive material is an epoxy-functional polymer, which as used herein include oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

For example, in one embodiment the polyfunctional carboxy-reactive material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least about 10, for example, or greater than about 15, or greater than about 20. These polymeric materials generally have a molecular weight greater than about 3000, preferably greater than about 4000, and more preferably greater than about 6000. These are commercially available from Johnson Polymer, LLC under the Joncryl® trade name, preferably the Joncryl® ADR 4368 material.

Another example of a carboxy-reactive copolymer is the reaction product of an epoxy-functional $C_{1-4}$(alkyl)acrylic monomer with a non-functional styrenic and/or $C_{1-4}$(alkyl) acrylate and/or olefin monomer. In one embodiment the epoxy polymer is the reaction product of an epoxy-functional (meth)acrylic monomer and a non-functional styrenic and/or (meth)acrylate monomer. These carboxy reactive materials are characterized by relatively low molecular weights. In another embodiment, the carboxy reactive material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth) acrylate includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable $C_{1-4}$(alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene.

In another embodiment, the carboxy reactive material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below about 1000 g/mol, to facilitate blending with the polyester resin. In one embodiment the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate.

The difunctional epoxide compounds can be made by techniques well known to those skilled in the art. For example, the corresponding α- or β-dihydroxy compounds can be dehydrated to produce the epoxide groups, or the corresponding unsaturated compounds can be epoxidized by treatment with a peracid, such as peracetic acid, in well-known techniques. The compounds are also commercially available.

Other preferred materials with multiple epoxy groups are acrylic and/or polyolefin copolymers and oligomers containing glycidyl groups incorporated as side chains. Suitable epoxy-functional materials are available from Dow Chemical Company under the tradename D.E.R.332, D.E.R.661, and D.E.R.667; from Resolution Performance Products under the trade name EPON Resin 1001F, 1004F, 1005F, 1007F, and 1009F; from Shell Oil Corporation under the tradenames Epon 826, 828, and 871; from Ciba-Giegy Corporation under the tradenames CY-182 and CY-183; and from Dow Chemical Co. under the tradename ERL-4221 and ERL-4299. As set forth in the Examples, Johnson Polymer Co is a supplier of an epoxy functionalized material known as ADR4368 and 4300. A further example of a polyfunctional carboxy-reactive material is a co- or terpolymer including units of ethylene and glycidyl methacrylate (GMA), sold by Arkema under the trade name LOTADER®.

In still another embodiment, the carboxy-reactive material is a multifunctional material having two or more reactive groups, wherein at least one of the groups is an epoxy group and at least one of the groups is a group reactive with the polyester, but is not an epoxy group. The second reactive group can be a hydroxyl, an isocyanate, a silane, and the like.

Examples of such multifunctional carboxy-reactive materials include materials with a combination of epoxy and silane functional groups, preferably terminal epoxy and silane groups. The epoxy silane is generally any kind of epoxy silane wherein the epoxy is at one end of the molecule and attached to a cycloaliphatic group and the silane is at the other end of the molecule. A desired epoxy silane within that general description is of the following formula:

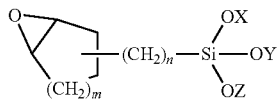

wherein m is an integer of 1, 2 or 3, n is an integer of 1 to 6, inclusive, and X, Y, and Z are the same or different, preferably the same, and are alkyl groups of one to twenty carbon atoms, inclusive, cycloalkyl of four to ten carbon atoms, inclusive, alkylene phenyl wherein alkylene is one to ten carbon atoms, inclusive, and phenylene alkyl wherein alkyl is one to six carbon atoms, inclusive. Desirable epoxy silanes within this range are compounds wherein m is 2, n is 1 or 2, desirably 2, and X, Y, and Z are the same and are alkyl of 1, 2, or 3 carbon atoms inclusive. Epoxy silanes within the range which in particular can be used are those wherein m is 2, n is 2, and X, Y, and Z are the same and are methyl or ethyl.

Such materials include, for example, β-(3,4-epoxycyclohexyl)ethyltriethoxysilane, available under the trade name CoatOSil 1770 from GE. Other examples are β-(3,4-epoxycyclohexyl)ethyltrimethoxysilane, available under the trade name Silquest A-186 from GE, and 3-glycidoxypropyltriethoxysilane, available under the trade name Silquest Y-15589 from GE.

The carboxy-reactive material is added to the polyester compositions in amounts effective to improve visual and/or measured physical properties. In one embodiment, the carboxy-reactive materials are added to the polyester compositions in an amount effective to improve the solvent resistance of the composition, in particular the fuel-resistance of the composition. A person skilled in the art may determine the optimum type and amount of any given carboxy-reactive material without undue experimentation, using the guidelines provided herein.

The type and amount of the carboxy reactive material will depend on the desired characteristics of the composition, the type of polyester used, the type and amount of other additives present in the composition and like considerations, and is generally at least 0.01 weight percent (wt. %) based on the weight of the total composition. In one embodiment, the amount of the carboxy-reactive material is 0.01 to 20 wt. %. In one embodiment, the amount of the carboxy-reactive material is 0.01 to 30 wt. %., or more.

In one embodiment, the modified polybutylene terephthalate random copolymer is used in conjunction with a polyalkylene terephthalate. The polyalkylene terephthlate can be selected from the group consisting of polycyclohexane dimethanol terephthalate, copolyesters of tereptthalate ester or acid with comonomers containing cyclohexane dimethanol and ethylene glycol, polyethylene terephthalate, polytrimethylene terephthalate, poly-xylylene terephthalate, polydianol terephthalates, polybutylene terephthalate, polyester naphthalates, and combinations thereof. The amount of the polyalkylene terephthalate can range from 1% to 80% of the total composition.

In one embodiment, a composition contains a flame retarding component. The flame-retarding component can be added the composition to suppress, reduce, delay or modify the propagation of a flame through a composition or an article based on the composition. The flame-retarding component can be halogenated hydrocarbons (chlorine and bromine containing compounds and reactive flame retardants), inorganic flame retardants (boron compounds, antimony oxides, aluminum hydroxide, molybdenum compounds, zinc and magnesium oxides), phosphorous containing compounds (organic phosphates, phospinates, phosphites, phosphonates, phosphene, halogenated phosphorus compounds and inorganic phosphorus containing salts) and nitrogen containing compounds like melamine cyanurate.

Inorganic flame retardants can include metal hydroxides, antimony compounds, boron compounds, other metal compounds, phosphorous compounds, other inorganic flame-retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octa molybdate (AOM), zirconium compounds, titanium compounds, zinc compounds such as zinc stannate, zinc hydroxy-stannate, as well as others.

The flame retarding component can include halogen-containing compounds. Examples of suitable halogenated organic flame retardants can include brominated flame retardants, chlorinated flame retardants. Examples of such flame retardants include tetrabromobisphenol A, octabromobiphenyl ether, decabromodiphenyl ether, bis(tribromophenoxy) ethane, tetrabromobiphenyl ether, hexabromocyclododecane, tribromophenol, bis(tribromophenoxy)ethane tetrabromobisphenol A polycarbonate oligomers, tetrabromobisphenol A epoxy oligomers. Typically halogenated aromatic flame-retardants include tetrabromobisphenol, a polycarbonate oligomer, polybromophenyl ether, brominated polystyrene, brominated BPA polyepoxide, brominated imides, brominated polycarbonate, poly(haloaryl acrylate), poly (haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

Chlorinated flame retardants include chlorinated paraffins, bis (hexachlorocyclopentadieno)cyclo-octane as well other such functionally equivalent materials.

The flame-retarding component can include phosphoros-containing compounds. Examples of suitable phosphorous flame retardants include red phosphorus, ammonium polyphosphate. Organophoshoros flame retardants can include halogenated phosphates, non-halogenated compounds. Examples of such materials include tris(1-chloro-2-propyl) phosphate, tris(2-chloroethyl) phosphate, tris(2,3-dibromopropyl) phosphate, phosphate esters, trialkyl phosphates, triaryl phosphates, aryl-alkyl phosphates, and combinations thereof. Other flame retardants can include polyols, phosphonium derivatives, phosphonates, phosphanes, phosphines.

Specific structures of phosphorous-containing compounds are discussed below:

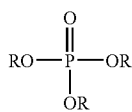

phosphate, where R can be selected from the group of alkyl, aryl, aralkyl, cyclohexyl, isopropyl, isobutyl, and the like.

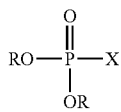

phosphonate, where X is H, and R, where R can be selected from the group of alkyl, aryl, aralkyl, cyclohexyl, isopropyl, isobutyl, and the like.

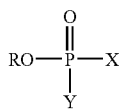

phosphinate, where X and Y=H, and R, where R can be selected from the group of alkyl, aryl, aralkyl, cyclohexyl, isopropyl, isobutyl, and the like, OH, amino functionalized compounds.

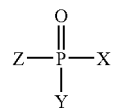

phosphine oxide, where X, Y, Z=H and R, where R can be selected from the group of alkyl, aryl, aralkyl, cyclohexyl, isopropyl, isobutyl, and the like.

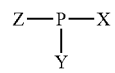

phosphine, where x, y, and z can be selected from the group of H, alkyl, aryl, aralkyl, and the like.

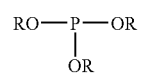

phosphite, where R can be selected from the group of alkyl, aryl, aralkyl, cyclohexyl, isopropyl, isobutyl, and the like, and H.

As such, suitable flame retarding that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl)phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas below:

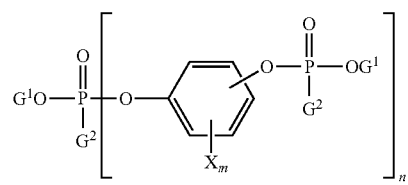

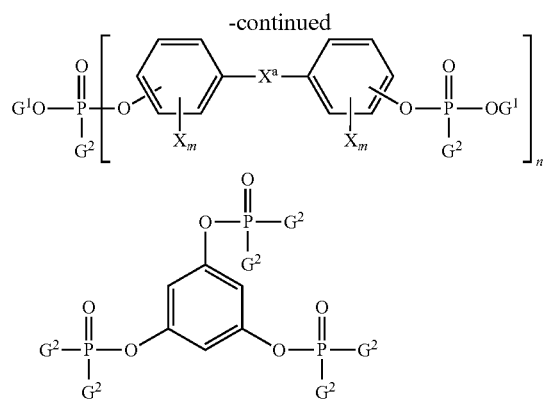

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is independently a bromine or chlorine; m is 0 to 4; and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary suitable flame-retarding compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 1 to about 20 parts by weight, based on 100 parts by weight of the total composition.

In one embodiment, the flame-retarding polyester composition includes a flame retarding quantity of one or a mixture of nitrogen-containing flame retardants such as triazines, guanidines, cyanurates, and isocyanurates. Suitable triazines have the formula

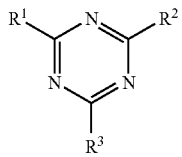

wherein R1, R2, and R3 are independently C1-C12 alkyl, C1-C12 alkoxyl, C6-C12 aryl, amino, C1-C12 alkyl-substituted amino, or hydrogen. Highly suitable triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Suitable guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame-retardants are used in combination with one or more phosphorous-based compounds. The phosphinates and diphosphinates include those set forth in U.S. Pat. No. 6,255,371 to Schosser et al. Specific phosphinates mentioned include aluminum diethylphosphinate (DEPAL), and zinc diethylphosphinate (DEPZN). The phosphinates have the formula (I)

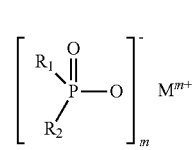

and/or formula II

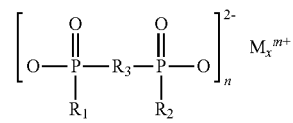

and or polymers comprising such formula I or II, where R1 and R2 are identical or different and are H, C1-C6-alkyl, linear or branched, and/or aryl; R3 is C1-C10, alkylene, linear or branched, C6-C10-arylene, -alkylarylene or -arylalkylene; M is any metal, but suitable are magnesium, calcium, aluminum or zinc, m is 1, 2 or 3; n is 1, 2 or 3; x is 1 or 2.

In one embodiment, R1 and R2 can be H, in addition to the substituents referred to set forth. This results in a hypophosphite, a subset of phosphinate, such as Calcium hypophosphite, aluminum hypophosphite and the like.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially suitable is antimony trioxide ($Sb_2O_3$). Synergists, such as antimony oxides, are typically used at about 0.5 to 15 by weight based on the weight percent of resin in the final composition.

Also, the final composition may contain polytetrafluoroethylene (PTFE) type resins or copolymers used to reduce dripping in flame-retarding thermoplastics.

Flame-retardant additives are desirably present in an amount at least sufficient to reduce the flammability of the polyester resin, preferably to a UL94 V-0 rating. The amount will vary with the nature of the resin and with the efficiency of the additive. The amount of the flame retarding component is generally at least 1 wt. %. In one embodiment, the amount of the flame retarding component ranges from 5 wt. % to 30 wt %. In another embodiment, the amount of the flame retarding component ranges from 10 to 20 wt. %.

A polycarbonate can be used in some embodiments. As used herein, the terms "polycarbonate" and "polycarbonate resin" mean compositions having repeating structural carbonate units of the formula (1):

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

As used herein, the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "arylene" refers to a benzene ring diradical or to a benzene ring system diradical fused to at least one optionally substituted benzene rings; "acyl" refers to a monovalent hydrocarbon radical joined to a carbonyl carbon atom, wherein the carbonyl carbon further connects to an adjoining group; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; and "direct bond", where part of a structural variable specification, refers to the direct joining of the substituents preceding and succeeding the variable taken as a "direct bond."

Polycarbonates may be produced by the interfacial reaction of dihydroxy compounds having the formula HO—$R^1$—OH, which includes dihydroxy compounds of formula (3)

$$HO-A^1-Y^1-A^2-OH \quad (3)$$

wherein $Y^1$, $A^1$ and $A^2$ are as described above. Also included are bisphenol compounds of general formula (4):

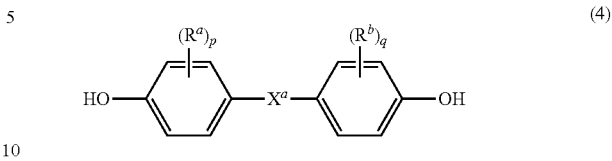

wherein $R^a$ and $R^b$ each represent a halogen atom or a monovalent hydrocarbon group and may be the same or different; p and q are each independently integers of 0 to 4; and $X^a$ represents one of the groups of formula (5):

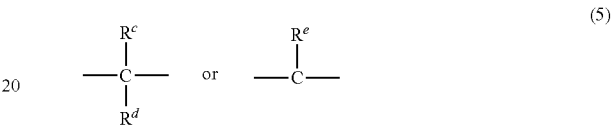

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl) propane, bis(4-hydroxyphenyl) phenylmethane, 2,2-bis(4-hydroxy-3-bromo-phenyl) propane, 1,1-bis (hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, 6,6'-dihydroxy-3, 3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds represented by formula (3) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis (4-hydroxyphenyl) phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, trisp-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid. The branching agents may be added at a level of 0.05 to 2.0 wt. % of the polycarbonate. All types of polycarbonate end groups are contemplated as being useful in the polycarbonate, provided that such end groups do not significantly affect desired properties of the thermoplastic compositions.

In a specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000, as measured by gel permeation chromatography (GPC) using a crosslinked styrene-divinyl benzene column, at a sample concentration of 1 milligram per milliliter, and as calibrated with polycarbonate standards.

"Polycarbonates" and "polycarbonate resin" as used herein may include copolymers comprising carbonate chain units. A specific suitable copolymer is a polyester-polycarbonate, also known as a copolyester-polycarbonate and polyester-carbonate. Combinations of polycarbonates and polyester-polycarbonates may also be used. As used herein, a "combination" is inclusive of all mixtures, blends, alloys, reaction products, and the like. Polyester-polycarbonates contain, in addition to recurring carbonate chain units of the formula (1), repeating units of formula (6):

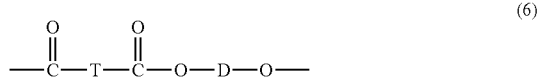

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In addition to the ester units, the polyester-polycarbonates comprise carbonate units as described hereinabove. Carbonate units of formula (1) may also be derived from aromatic dihydroxy compounds of formula (7), wherein specific carbonate units are resorcinol carbonate units.

Specifically, the polyester unit of a polyester-polycarbonate can be derived from the reaction of a combination of isophthalic and terephthalic diacids (or derivatives thereof) with resorcinol, bisphenol A, or a combination comprising one or more of these, wherein the molar ratio of isophthalate units to terephthalate units is 91:9 to 2:98, specifically 85:15 to 3:97, more specifically 80:20 to 5:95, and still more specifically 70:30 to 10:90. The polycarbonate units can be derived from resorcinol and/or bisphenol A, in a molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the weight ratio of polycarbonate to polyester-polycarbonate in the blend can be, respectively, 1:99 to 99:1, specifically 10:90 to 90:10.

The polyester-polycarbonates may have a weight-averaged molecular weight (Mw) of 1,500 to 100,000, specifically 1,700 to 50,000, and more specifically 2,000 to 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

The polyester-polycarbonates may be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst may be 0.1 to 10 wt % based on the weight of bisphenol in the phosgenation mixture. In another embodiment an effective amount of phase transfer catalyst may be 0.5 to 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

In addition to the polycarbonates, polyester-polycarbonates, and combinations of these as described above, it is also possible to use combinations of the polycarbonates and polyester-polycarbonates with other thermoplastic polymers, for example combinations of polycarbonates and/or polycarbonate copolymers with polyesters.

The polycarbonate may also comprise a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (8):

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (8) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (9):

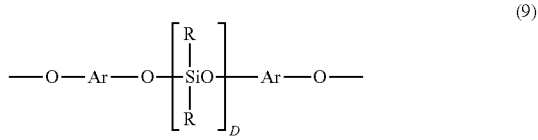

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl)methane, 1,1-bis(4-hydroxyphenyl)ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl)cyclohexane, bis(4-hydroxyphenyl sulphide), and 1,1-bis(4-hydroxy-t-butylphenyl) propane. Combinations comprising at least one of the foregoing dihydroxy compounds may also be used.

Units of formula (9) may be derived from the corresponding dihydroxy compound of formula (10):

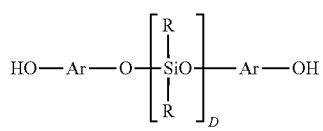

(10)

wherein R, Ar, and D are as described above. Compounds of formula (10) may be obtained by the reaction of a dihydroxyarylene compound with, for example, an alpha,omega-bisacetoxypolydiorangonosiloxane under phase transfer conditions.

In another embodiment, polydiorganosiloxane blocks comprise units of formula (11):

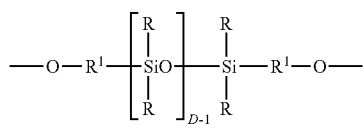

(11)

wherein R and D are as described above, and each occurrence of $R^1$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (12):

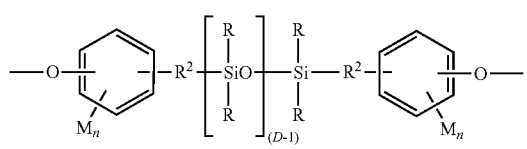

(12)

wherein R and D are as defined above. Each $R^2$ in formula (12) is independently a divalent $C_2$-$C_8$ aliphatic group. Each M in formula (12) may be the same or different, and may be a halogen, cyano, nitro, $C_1$-$C_8$ alkylthio, $C_1$-$C_9$ alkyl, $C_1$-$C_9$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (12) may be derived from the corresponding dihydroxy polydiorganosiloxane (13):

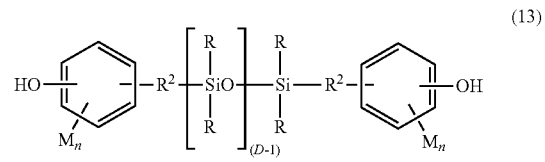

(13)

wherein R, D, M, $R^2$, and n are as described above. Such dihydroxy polysiloxanes can be made by effecting a platinum catalyzed addition between a siloxane hydride of formula (14):

(14)

wherein R and D are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate may comprise 50 to 99 wt. % of carbonate units and 1 to 50 wt. % siloxane units. Within this range, the polysiloxane-polycarbonate copolymer may comprise 70 to 98 wt. %, specifically 75 to 97 wt. % of carbonate units and 2 to 30 wt. %, specifically 3 to 25 wt. % siloxane units.

In an embodiment, the polysiloxane-polycarbonate may comprise polysiloxane units, and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polysiloxane-polycarbonates of different flow properties may be used to achieve the overall desired flow property.

The amount of the polycarbonate component varies with the specific application. Generally, the amount of the polycarbonate component is present in an amount ranging from 5 to 90 wt. %. In another embodiment, the amount of polycarbonate present in the composition ranges from to 20 to 70 wt. %.

The impact modifier component is generally a rubbery material, which when used in suitable amounts, imparts energy absorbing properties to the composition. Suitable rubbery impact modifiers include (a) methacrylate butadiene styrene rubbers, (b) acrylate rubbers, (c) acrylonitrile-styrene-acrylate rubbers, (d) high rubber graft acrylonitrile-butadiene-styrenes, (e) acrylate-olefin copolymers, (f) polyolefin modifiers, or (g) silicone-acrylic modifiers (e.g., METABLEN™ S made by Mitsubishi Rayon).

More particularly, the impact modifier can include an acrylonitrile-butadiene-styrene (ABS) polymer of the high rubber graft impact modifier. Rubber modified monovinylidene aromatic resins comprising (a) a rubber modified monovinylidene aromatic graft copolymer and (b) an ungrafted rigid copolymer, are generally prepared by graft polymerization of a mixture of a monovinylidene aromatic monomer and one or more comonomers in the presence of one or more rubbery polymeric substrates. Depending on the amount of rubber present, a separate matrix or continuous rigid phase of ungrafted rigid (co)polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers.

Typically, the rubber modified resins comprise the rubber modified graft copolymer at a level of from 5 to 100 percent by weight based on the total weight of the resin, more preferably from 10 to 95 percent by weight thereof, more preferably 20 to 90 percent by weight thereof, and most preferably from 15 to 85 percent by weight thereof; and the rubber modified resin comprises the ungrafted rigid polymer at a level of from 0 to 95 percent by weight based on the total weight of the resin, more preferably from 5 to 90 percent by weight thereof, more preferably from 10 to 80 percent by weight thereof and most preferably from 15 to 85 percent by weight thereof. Higher levels of rubber are preferred.

Especially preferred are acrylonitrile-butadiene-styrene copolymers having greater than 30% by weight rubbery polymeric substrate, preferable greater than about 45% by weight rubbery polymeric substrate. The most preferred rubbery substates comprise polybutadiene or styrene-butadiene copolymer. Also preferred are high rubber graft acrolonitrile-butadiene-styrene copolymer. The phrase "high rubber graft" refers generally to graft copolymer resins wherein at least about 30% by weight, preferably at least about 45% by weight of the rigid polymeric phase is chemically bound or grafted to the rubbery polymeric phase. Suitable ABS-type high rubber graft copolymers are commercially available from, for example, under the trademark BLENDEX® resin grade 336 or 338. One preferred high rubber graft is CYCOLAC® C874202 resin of General Electric Company, Advanced Materials. A process for producing graft copolymer resins is set forth in U.S. Pat. No. 6,384,129 to Lowry entitled Semi-batch Emulsion Process for Making Diene Rubber Latex, Rubber Latex Made Thereby, and Graft Copolymer Made Therefrom.

Other typical impact modifiers are the following materials, or blends of two or more of these materials: (1) Paraloid EXL3300, which is Butylacylate-Methacrylate core-shell rubber; (2) ASA-HRG, which is Acrylonitrile-Styrene-ButylAcrylate copolymer; (3) AES, which is Acrylonitrile-Styrene-EPDM copolymer, where EPDM is ethylene-propylene non conjugated diene elastomer; (4) Lotader AX8900, which is Ethylene-Methacrylate-Glycidylmethacrylate copolymer with, or sometimes referred to as aterpolymer of ethylene, methyl acrylate and glycidyl methacrylate) Glycidylmethacrylate content of around 8%. The content of impact modifier is preferable less than 40% by weight, more preferable less than 30 percent, and most preferable less than 20 percent.

Core-shell copolymers, method of making core-shell copolymers and the use of core-shell copolymers as impact modifiers in combination with polycarbonate are described in U.S. Pat. Nos. 3,864,428 and 4,264,487. Suitable core-shell copolymers are those that include a rubbery "core" that has a glass transition temperature ("Tg") below about 10° C. and that comprises repeating units derived from one or more monoethylenically unsaturated monomers such as, e.g. acylate monomers, e.g. butyl acylate, and conjugated diene monomers, e.g., butadiene and a rigid "shell" that has a Tg of greater than or equal to about 10° C. and that has repeating units derived from a monoethylenically unsaturated monomer.

The amount of the impact modifier is generally at least 1 wt %. In one embodiment, the amount of the impact modifier ranges from 1 wt % to 50 wt %. In another embodiment, the amount of the impact modifier ranges from 5 to 25 wt. %.

When the polycarbonate component is used in conjunction with an impact modifiers, wherein a molding composition used to make an article has polybutylene terephthalate random copolymer is present in an amount ranging from 5 to 90 wt %, the polycarbonate is present in an amount ranging from 5 to 90 wt %; and the impact modifiers are present in an amount ranging that is at least 1 wt. %.

In one embodiment, in addition to containing the PET-derived PBT component, a molding composition can further include other polyesters. Such suitable polyesters can include those comprising structural units of the following formula:

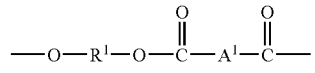

where each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-10}$ alkylene radical, a $C_{6-12}$ alicyclic radical, a $C_{6-20}$ aromatic radical or a polyoxyalkylene radical in which the alkylene groups contain about 2-6 and most often 2 or 4 carbon atoms. The $A^1$ radical in the above formula is most often p- or m-phenylene, a cycloaliphatic or a mixture thereof. This class of polyester includes the poly(alkylene terephthalates). Such polyesters are known in the art as illustrated by the following patents, which are incorporated herein by reference. In one embodiment, when a composition used to make articles contains polyethylene terephthalate the composition further comprises a polyester selected from the group consisting of polycyclohexane terephthalate glycol polycyclohexane terephthalate, polyethylene terephthalate glycol, polytrimethylene terephthalate, poly-xylylene terephthalate, polydianol terephthalate, polybutylene terephthalate, and combinations thereof.

U.S. Pat. Nos. 2,465,319; 2,720,502; 2,727,881; 2,822,348; 3,047,539; 3,671,487 3,953,394; and 4,128,526. Examples of aromatic dicarboxylic acids represented by the dicarboxylated residue $A^1$ are isophthalic or terephthalic acid, 1,2-di(p-carboxyphenyl)ethane, 4,4'-dicarboxydiphenyl ether, 4,4' bisbenzoic acid and mixtures thereof. Acids containing fused rings can also be present, such as in 1,4- 1,5- or 2,6-naphthalenedicarboxylic acids. The preferred dicarboxylic acids are terephthalic acid, isophthalic acid, naphthalene dicarboxylic acid, cyclohexane dicarboxylic acid or mixtures thereof. Particularly suitable polyesters are poly(ethylene terephthalate) ("PET"), and poly(1,4-butylene terephthalate), ("PBT"), poly(ethylene naphthanoate) ("PEN"), poly(butylene naphthanoate), ("PBN"), poly(cyclohexanedimethylene terephthalate) ("PCT"), cyclohexanedimethanol modified poly(ethylene terephthalate also known as polycyclohexylenedimethylene ethylene terephthalate) ("PETG" and "PCTG"), and (polypropylene terephthalate) ("PPT"), and mixtures thereof.

The amount of the additional polyester component in a composition used to make an article that is not the PET-derived PBT, in one embodiment, is generally at least 1 wt %. In one embodiment, the amount of the additional polyester component that is not the PET-derived PBT ranges from 5 wt. % to 90 wt. %.

Although articles are ordinarily made from a composition that includes from 5 to 99.99 wt % of a modified polybutylene terephthalate random copolymer; and (b) from 0.01 to 95 wt. % of a member selected from the group consisting of (1) fillers, (2) carboxy reactive materials (3) polyalkylene terephthalates, (4) polycarbonates and an impact modifiers, (5) impact modifiers, (6) polycarbonates, and (7) combinations thereof.

the invention also includes embodiments in which the composition requires other polyesters, instead of polyethylene terephthalate, e.g., a composition that includes from 5 to 99.99 wt % of a modified polybutylene terephthalate random copolymer; and (b) from 0.01 to 95 wt. % of a member selected from the group consisting of (1) fillers, (2) carboxy reactive materials (3) polyalkylene terephthalates, (4) polycarbonates and an impact modifiers, (5) impact modifiers, (6) polycarbonates, and (7) combinations thereof.

Of course, the invention can include compositions used to make the articles, e.g., compositions containing composition that includes from 5 to 99.99 wt % of a modified polybutylene terephthalate random copolymer; and (b) from 0.01 to 95 wt. % of a member selected from the group consisting of (1) fillers, (2) carboxy reactive materials (3) polyalkylene terephthalates, (4) polycarbonates and an impact modifiers, (5) impact modifiers, (6) polycarbonates, and (7) combinations thereof. In another embodiment, an article of the invention can be made with a composition that further includes a quencher. The quencher component of the molding composition generally includes a variety of quenchers. Suitable quenchers include a solution of 45% phosphorous acid in water that is added as a catalyst quencher to prevent the transesterification of polycarbonate and the polyesters. Other examples of quenchers include phosphoric acid, transition metal phosphates, and other non-acidic species. Specific examples of quenchers include zinc phosphate, monozinc phosphate, calcium phosphate, phosphorous acid, and combinations thereof. The effective quantities of quenching agents are well known in the literature. An effective amount will ordinarily be from 50 to 500 ppm, or more. Quenchers will be particularly useful in compositions containing the modified polybutylene terepthalate random copolymer, a polycarbonate component, and an impact modifier.

A composition used to make an article can further include an additive selected from the group consisting of flame retardants, stabilizers, e.g., UV modifiers, thermal stabilizers, mold release agents, teflon-styrene acrylonitrile mixtures, and combinations thereof. Suitable UV modifiers generally include a wide variety of UV absorbers. Examples of UV absorbers include, but are not limited to, salicylic acid UV absorbers, benzophenone UV absorbers, benzotriazole UV absorbers, cyanoacrylate UV absorbers and mixtures thereof A molding composition of the invention may further contain a heat stabilizer. Suitable heat stabilizers include, but are not limited to, phenol stabilizers, organic thioether stabilizers, organic phosphide stabilizers, hindered amine stabilizers, epoxy stabilizers and mixtures thereof. The heat-resistant stabilizer may be added in the form of a solid or liquid.

The amount of such additives in a molding composition used to make an article is generally at least 0.1 wt. %. In one embodiment, the amount of the mold release agent ranges from 0.1 to 2 wt. %. In another embodiment, the amount of the mold release agent ranges from 0.5 to 1 wt. %.

In another embodiment, in addition to containing the PET-derived modified PBT component, a molding composition can further include mold-release agents. Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned. The mold release agent can be used in conjunction with other additives, e.g., teflon styrene acrylonitrile mixtures.

The amount of the mold release agent can be in the molding composition is generally at least 0.1 wt. %. In one embodiment, the amount of the mold release agent ranges from 0.1 to 2 wt. %. In another embodiment, the amount of the mold release agent ranges from 0.5 to 1 wt. %.

Compositions used to make articles from the modified polybutylene terephthalate random copolymer and the member selected from the group consisting of (1) fillers, (2) carboxy reactive materials (3) polyethylene terephthalate, and (4) a component including a polycarbonate and an impact modifier, (5) impact modifiers, (6) polycarbonates, and (7) combinations thereof, can be made by various ways. In one embodiment a composition used to make an article may be made by conventional blending techniques. The production of the compositions may utilize any of the blending operations known for the blending of thermoplastics, for example blending in a kneading machine such as a Banbury mixer or an extruder. To prepare the composition, the components may be mixed by any known methods. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device.

In one embodiment of the present invention the composition can be prepared by solution method. The solution method involves dissolving all the ingredients in a common solvent (or) a mixture of solvents and either precipitation in a non-solvent or evaporating the solvent either at room temperature or a higher temperature of at least about 50° C. to about 80° C. In one embodiment, the reactants can be mixed with a relatively volatile solvent, preferably an organic solvent, which is substantially inert towards the polymer, and will not attack and adversely affect the polymer. Some suitable organic solvents include ethylene glycol diacetate, butoxyethanol, methoxypropanol, the lower alkanols, chloroform, acetone, methylene chloride, carbon tetrachloride, tetrahydrofuran, and the like. In one embodiment of the present invention the non solvent is at least one selected from the group consisting of mono alcohols such as ethanol, methanol, isopropanol, butanols and lower alcohols with C1 to about C12 carbon atoms. In one embodiment the solvent is chloroform.

In one embodiment, the ingredients are pre-compounded, pelletized, and then molded. Pre-compounding can be carried out in conventional equipment. For example, after pre-drying the polyester composition (e.g., for about four hours at about 120° C.), a single screw extruder may be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) may be fed downstream. The pre-compounded composition can be extruded and cut up into molding compounds such as conventional granules, pellets, and the like by standard techniques. The composition can then be molded in any equipment conventionally used for thermoplastic compositions, such as a Newbury type injection molding machine with conventional cylinder temperatures, at about 230° C. to about 280° C., and conventional mold temperatures at about 55° C. to about 95° C.

An article can be made by a suitable conversion process, e.g., injection molding, compression molding, blow molding, sheet extrusion, or film extrusion processes. Any composition described herein can be used in such a conversion process. Injection molding is the most prevalent method of manufacturing for non-reinforced thermoplastic parts, and is becoming more commonly used for short-fiber reinforced thermoplastic composites. Injection molding can be used to produce articles according to the present invention. Injection molding is a process where an amount of polymer blend several times that necessary to produce an article is heated in a heating chamber to a viscous liquid and then injected under pressure into a mold cavity, and thereby forming the article. The polymer blend remains in the mold cavity under high pressure until it is cooled and is then removed. The term "injection molding" also encompasses reaction injection molding, where a two-part semi-liquid resin blend is made to flow through a nozzle and into a mold cavity where it polymerizes as a result of a chemical reaction. Injection molding and injection molding apparatii are discussed in further detail in U.S. Pat. No. 3,915,608 to Hujick; U.S. Pat. No. 3,302,243 to Ludwig; and U.S. Pat. No. 3,224,043 to Lameris. Injection molding is the fastest of the thermoplastic processes, and thus is generally used for large volume applications such as automotive and consumer goods. The cycle times range between 20 and 60 seconds. Injection molding also produces highly repeatable near-net shaped parts. The ability to mold around inserts, holes and core material is another advantage. Finally, injection molding generally offer the best surface finish of any process. The skilled artisan will know whether injection molding is the best particular processing method to produce a given article according to the present invention.

As such, in one embodiment, the invention includes a method for injection molding an article that includes heating a composition in a chamber to a viscous liquid, and injecting the composition under pressure into a mold cavity dimensioned, where the composition includes (a) from 5 to 99.99 wt. % of a modified polybutylene terephthalate random copolymer that (1) is derived from polyethylene terephthalate and (2) a residue derived from the polyethylene terephthalate component is selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, alkali salts, alkaline earth metal salts, e.g., calcium, magnesium, sodium and potassium salts, phosphorous-containing compounds and anions, sulfur-containing compounds and anions, napthalene dicarboxylic acids, 1,3-propanediol groups, and combinations thereof.

Blow molding is a technique for production of hollow thermoplastic products. Blow molding involves placing an extruded tube of a thermoplastic polymer according to the present invention, in a mold and applying sufficient gas pressure to the inside of the tube to cause the outside of the tube to conform to the inner surface of the die cavity. U.S. Pat. No. 5,551,860 describes a method of performing blow molding to produce an article of manufacture in further detail. Blow molding is not limited to producing hollow objects. For example a "housing" may be made by blowing a unit and then cutting the unit in half to produce two housings. Simple blown bubble film processes are also described, for example, in The Encyclopedia of Chemical Technology, Kirk-Othmer, Third Edition, John Wiley & Sons, New York, 1981, Vol. 16, pp. 416-417 and Vol. 18, pp. 191-192.

Oriented films may be prepared through blown film extrusion or by stretching cast or calendered films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

More particularly, a process for blow-molding compositions may be practiced by using conventional blow-molding apparatus. In this connection, the resin composition is plasticized with an extruder or the like, and is extruded or injected through an annular die to form a tubular intermediate parison. The tubular parison is then clamped between mold parts forming a mold cavity and a pressurized fluid (e.g. air) is injected into the interior of the clamped parison so that it inflates and conforms to the walls of the mold cavity. The resin composition is then allowed to cool and solidify at which time the mold is parted and the hollow blow-molded article is removed.

During blow-molding, temperatures of the extruder cylinder and the die are each preferably maintained at between about 225 degrees to about 280 degrees C., more preferably between about 230 degrees to about 250 degrees C. The mold temperature is preferably between about 40 degrees to about 120 degrees C., and more preferably between about 60 degrees to about 100 degrees C. Although air is most preferably used as the inflation gas due to economic considerations, nitrogen or any other inert gas may be used, if desired. The pressure of the inflation fluid is preferably between 4 to 10 kg/cm$^2$.

Hollow blow-molded articles having stable qualities and shapes may be obtained. Articles that are particularly suitable for blow-molding process include those articles that include (a) from 5 to 99.99 wt % of a modified polybutylene terephthalate random copolymer that (1) is derived from polyethylene terephthalate and (2) contains a residue derived from the polyethylene terephthalate component is selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, alkali salts, alkaline earth metal salts, e.g., calcium, magnesium, sodium and potassium salts, phosphorous-containing compounds and anions, sulfur-containing compounds and anions, napthalene dicarboxylic acids, 1,3-propanediol groups, and combinations thereof.

In one embodiment, an article can be made by a thermo-forming process. Thermo-forming usually begins with plastic sheet or film: sheet thickness tends to be 10 mil (250 μm) and greater; film thicknesses are normally less than 500 mil (130 mm). Extrusion is the most common method of producing sheet and film for thermo-forming; very small amounts are cast or calendered.

Thermo-forming typically involves heating extruded thermoplastic sheet, film, and profile to its softening heat and forcing the hot and flexible material against the contours of a mold by pneumatic means (differentials in air pressure are created by pulling a vacuum between the plastic and the mold, or the pressure of compressed air is used to force the material against the mold), mechanical means (plug, matched mold, etc.), or combinations of pneumatic and mechanical means.

The process involves (1) heating the sheet (film, etc.) in a separate oven, (2) transferring the hot sheet to a forming press, (3) using automatic machinery to combine heating and forming in a single unit, or (4) a continuous operation feeding off a roll of plastic or directly from the exit of an extruder die (postforming). Almost all the materials are thermoplastic.

These thermoplastics can be reinforced or unreinforced. Almost any thermoplastic can be used, but certain types make it easier to achieve deep draws without tearing or excessive thinning in areas such as corners. Ease of forming depends on material characteristics; it is influenced by minimum and maximum thickness, pinholes, the ability of the material to retain heat gradients across the surface and the thickness, the controllability of applied stress, the rate and depth of draw, the mold geometry, the stabilizing of uniaxial or biaxial deformation, and most important, minimizing the thickness variation of the sheet.

Bending, one of the oldest thermo-forming techniques, is relatively easy to handle. It is often accompanied by joining (adhesive or welding) or mechanical operations (milling, drilling, polishing). If the sheet is heated only locally in the bending operation, no special forming tools are needed. The width of the heating zone and the thickness of the sheet determine the bending radius. Limitations are related to the softening point of the sheet and the intrinsic rigidity of the heated sheet (sag should be minimized). Transparent plastics (such as PMMA and PC) with thicknesses up to 32 in. (90 mm) are frequently bent for use in store displays, staircases, partitions in banks, aircraft windows, and so on. With this type of plastic, if restrictions in the bending area are minimized, the thickness at the bend can remain unchanged.

Thermo-forming processes that can have several advantages over other methods of thermoplastic fabrication. For instance, parts with a large surface area can be formed with relatively low mold and equipment cost, because of the low pressures required. Very thin-walled parts can be readily formed, which is not feasible by any other method. High-volume thin-walled products, such as drinking cups, can be produced at the lowest cost per capital investment, at production rates of 50 000 to over 200 000 units per hour. Low-volume heavy-gauge products, such as computer housings, are competing favorably with injection molding in price, through lower tooling costs, and in product detail with 690 kPa (100 psi) forming pressures.

In one embodiment, an article can be made using a rotation molding process as follows. An inner wall of the mold in the rotation molding apparatus can be coated with a silicone release agent and inerted with nitrogen. Then, granulate polycarbonate powder (or other suitable material) can be transferred into the rotating spherical mold. Via a heating mantle the mold is heated to a suitable temperature, e.g., from 40° C. up to 330° C. over a period of 15 up to 20 minutes under multi-axial rotation until a uniformly dispersed melt is obtained. The temperature is kept at a suitable temperature, e.g., 330° C. for a suitable period such about 3 minutes after which the temperature is brought down to 40° C. over a period of about 15 minutes. After cooling down the obtained globe is taken out of the mold and inspected with respect to aesthetics. Particular attention is paid to crater-like surface defects resembling 'orange skin'. Also the ease of release from the mold is noted. The rotation molding process of one part takes about 50 minutes time. According to this process two types of globes can be molded. Such articles can have a wall thickness between 3 and 2.5 mm. Of course, other variations are possible.

In another embodiment, shaped parts can be made from pultrusion techniques. The term "pultrusion" as used herein is a coined term for a plastic resin, often a resin-impregnated with reinforcing continuous strands of reinforcing fibers, is pulled through the orifice of a die. The process yields continuous lengths of material with high unidirectional strengths, used for building siding, fishing rods, pipe, golf club shafts, moldable tapes and like articles.

By the term "continuous strands of reinforcing fibers" we mean any fibrous or filamentous structure such as a yarn, in which the fibers/filaments are sufficiently long to give a roving, tow or yarn of sufficient strength, under the processing conditions described hereinafter, to be pultruded with a molten thermoplastic polymer resin and a sizing die without such a frequency of breakage as to render the impregnated length unusable.

The dimensions of the articles made in accordance with our invention can vary. For instance, the article can have a length ranging from 0.5 mm to a continuous article wound on a spool a width ranging from 0.5 mm to 2000 mm, and a thickness ranging from 0.1 mm to 25 mm. Thermo-formed particles can have a length ranging from 0.5 mm to 3000 mm, a width ranging from 0.5 mm to 3000 mm wide, and a thickness ranging from 0.1 to 5 mm. An extruded article, e.g., a member selected from the group consisting of extruded sheets, extruded films, the member having a width ranging from 25 mm to 2000 mm, and a thickness ranging from 0.12 mm to 25 mm. In one embodiment, an article is a melt blown fiber or a cold drawn fiber and the article has a diameter ranging from 1 to 6000 microns. In one embodiment, fiber articles include those selected from the group consisting of melt blown fibers, cold drawn fibers, and extruded fibers.

Accordingly, there are numerous articles that can include injected molded articles, thermoformed articles, blow molded articles, extruded articles, rotationally molded articles. Examples of articles include but are not limited to electrical connectors, coil forms, power distribution housings, fuel modules, fuel tanks, films, structural reinforcements, grill opening reinforcements in automotive and transportation applications, appliance components, housings, bezels, cell phone, lighting, interior, body panels, fenders, hoods, door skins, energy management modules, such as energy absorbers, bumpers, blow molded auto running boards, tractor housings, and the like.

Specific articles within the scope of the invention in certain industrial and automotive applications include and are not limited to connectors, energy absorbers, bezels, body panels, cell phone housings, furniture components, fabrics, and the like.

Our energy absorbers are generally exterior safety components that are rectangular and capable of absorbing impact energy, thereby minimizing damage to occupants and vehicles. Examples of such structures include bumpers, which may be located in front of a steel beam, or which may be covered by a fascia, steel beam, EA, fascia construct. Suitable energy absorbers can have a configuration which promotes superior energy absorption efficiency and fast loading. The configuration permits the system to be packaged into a relatively small space compared to conventional foam systems. This gives automotive designers the freedom to style bumper systems with reduced overhang while enhancing the impact performance of the system. Enhanced bumper impact performance translates to reduced costs of repair for low speed "fender benders" and greater occupant safety during higher speed collisions. Since the primary absorbing system can be achieved with a unitary and integrally molded thermoplastic engineering resin, the primary energy absorbing system can be easily recycled. Since foam is not utilized, greater consistency of impact performance may be achieved over varied temperatures. Another desirable characteristic of the invention is a smooth, predictable, loading response essentially regardless of load direction. This is especially important for front energy absorbing applications where consistent bumper system response is important to crash severity sensors.

Energy absorbers can include bumper systems comprising a beam configured to attach to vehicle rails and an energy absorber coupled to the beam is provided. The bumper system can be molded from compositions containing the modified PBT random copolymers, polycarbonate, and impact modifiers. The energy absorber is tunable for meeting predetermined criteria for both low speed and pedestrian impacts. In another embodiment, the energy absorber is a bumper assembly for an automotive vehicle is provided. The bumper assembly is molded from PET derived PBT Xenoy engineering thermoplastic resin. The bumper assembly comprises a beam configured to attach to vehicle rails, an energy absorber, and a fascia attachable to the energy absorber to substantially envelop the beam and energy absorber. The energy absorber is tunable for meeting predetermined criteria for both low speed and pedestrian impacts.

In yet another aspect, an energy absorber for a vehicle bumper system is provided. The energy absorber is molded from PET derived PBT Xenoy engineering thermoplastic resin. The energy absorber is tunable for meeting predetermined criteria for both low speed and pedestrian impacts and comprises a flanged frame and a body extending from the frame. The body comprises a plurality of lobes. Further description of energy absorbers can be found in U.S. Pat. Nos. 6,406,081, 6,726,262, incorporated herein by reference in their entirety.

Generally, a body panel is a suitably dimensioned structure that provides structural support and vehicle integrity. The dimensions of such body panels can vary. For instance, the length of a body panel can range from 12 to 120" (30 to 300 cm) or more. The width of a body panel can range from 12 to 120" (30 to 300 cm) or more. And the height (wall thickness) range can be at least 2 mm. In one embodiment, the height/wall thickness can range from 2 mm to 4 mm.

A body panel can be made by any suitable method. For instance, in one embodiment, a body panel can be made through injection molding. In another embodiment, a body panel can be made by a thermo-forming process.

The properties of such a body panel include excellent flexural modulus, high tensile strength, good multiaxial impact, high heat resistance, low coefficient of thermal expansion, good dimensional stability, paintability.

Advantageously, in one embodiment, an article is a composite selected from the group consisting of (i) composites containing polybutylene terephthalate random copolymers and glass fillers, (ii) composites containing polybutylene terephthalate random copolymers and carbon fibers, (iii) polycarbonate, polybutylene terephthalate random copolymers and carbon fibers, and (iv) polycarbonate, polybutylene terephthalate random copolymers and glass fibers. Such articles can include body panels.

In one embodiment, an article is a lighting bezel. A bezel is generally an exterior decorative housing that encloses a lighting component. The dimensions can vary, depending on need.

In one embodiment, the length is from 20 to 24 inches long (50 to 60 cm), from 2-3" wide (5 to 8 cm), the height can be from 10 to 15 inches long and the thickness from 2 to 3 mm.

The shape of the bezels can vary depending on the application. As such, rectangular, circular, or otherwise angular bezels are within the scope of the invention. A bezel can be made by any suitable method. Generally, a bezel can be made by injection molding processes.

The physical properties of a bezel can vary. Generally, bezels exhibit high heat resistance, up to 175 C, good dimensional stability, capable of being metallized (base coating or direct), smooth glossy surface, shrinkage can meet customer's tooling requirement (easy shape and release), chemical resistance, minimal outgassing (maintains shiny surface).

Our energy absorbers are generally exterior safety components that are rectangular and capable of absorbing impact energy, thereby minimizing damage to occupants and vehicles. Examples of such structures include bumpers, which may be located in front of a steel beam, or which may be covered by a fascia, steel beam, EA, fascia construct Such structures may be made by injection molding processes.

Energy absorbers exhibit excellent impact strength, tensile elongation, cold temperature impact and elongation performance, chemical resistance, good flow of the composition, and high heat resistance. Energy absorbers can be made from compositions containing from 5 to 99.99 wt % of a modified polybutylene terephthalate random copolymer that (1) is derived from polyethylene terephthalate and (2) contains a residue derived from polyethylene terepthalate that is selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, alkali salts, alkaline earth metal salts, e.g., calcium, magnesium, sodium and potassium salts, phosphorous-containing compounds and anions, sulfur-containing compounds and anions, napthalene dicarboxylic acids, 1,3-propanediol groups, and combinations thereof.

More particularly, when articles include energy absorbers, bezels, and connector, our invention includes specific advantageous embodiments. When the article is a bezel, for instance, a bezel can be derived from a composition comprising:

(a) a polyester component comprising from 50 to 99.99 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component;

(b) from 2 to 40 wt % of a filler component, (c) from 0.01 to 3 wt % of a stabilizer, (d) from 0 to 40 wt % of a polyalkylene terephthalate and the polyalkylene terephthalate is selected from the group consisting of polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, poly-xylylene terephthalate, polydianol terephthalates, polybutylene terephthalate, polyester naphthalates, and combinations thereof;

wherein components (a), (b), (c), (d), (e), and optionally at least one additive, are present in a total amount of 100 wt %. The polyester component can comprise a first polyester component having an intrinsic viscosity ranging from 0.5 to 1.0 dL/g and comprising the modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and a second polyester component having an intrinsic viscosity ranging from 1 to 1.4 dL/g and comprising the modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component.

When the article is an energy absorber, the composition used to make an energy absorber can comprise a polyester component comprising from (a) 20 to 70 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component; (b) from 20 to 70 wt %, a polycarbonate component; (c) from 1 to 30 wt % of an impact modifier; (d) from 0.001 to 1 wt % of a quencher; such that components (a), (b), (c), (d), and optionally at least one additive, are present in a total amount of 100 w t %. Suitable an article made from such a composition that contains less than 5 wt. % of a filler component. The polyester component can comprise a first polyester component having an intrinsic viscosity ranging from 0.5 to 1.0 dL/g and comprising the modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and a second polyester component having an intrinsic viscosity ranging from 1.1 to 1.4 dL/g and comprising the modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component.

When the article is a connector, the connector can be made from a composition comprising a polyester component comprising from 60 to 99.99 wt % of (a) a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component; (b) from 0 to 20 wt % copolyetherester; (c) from 0 to 40 wt % of a filler component, (d) from 0 to 20 wt % of a flame retarding component; and (e) from 0.01 to 2 wt % of a stabilizer, wherein components (a), (b), (c), (d), (e), and optionally at least one additive, are present in a total amount of 100 wt %. When copolyetheresters are present, the composition can contain from 1 to 10 wt % of the copolyetherester. Generally, when the copolyetherester is present the article is derived from a composition containing less than 5 wt. of fillers. In one embodiment, connectors are made from a composition containing from 5 to 40 wt % of fillers. When fillers are present in such amounts, the composition generally contains less than 5 wt. of a copolyetherester.

Advantageously, articles include also fibers. In one version of the invention, an article includes a plurality of fibers having a diameter ranging from 5 μm to 50 μm. Fibers, monofilaments, can also be extruded with diameters ranging from 5 or 500 to 2000 μm. In another embodiment, the article is a member selected from the group consisting of melt blown fibers, spun fibers, cold drawn fibers, electrostatic spun fibers, and extruded fibers. Fiber articles can further be used in fabrics, filter materials and carpets.

Advantageously, in another embodiment, an article can have various wall thicknesses. In one embodiment, the article is a composition of matter comprising an article containing:

(a) from 5 to 99.99 wt. % of a modified polybutylene terephthalate random copolymer that (1) is derived from polyethylene terephthalate and (2) contains at least one residue derived from polyethylene terepthalate selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, alkali salts, alkaline earth metal salts, e.g., calcium, magnesium, sodium and potassium salts, phosphorous-containing compounds and anions, sulfur-containing compounds and anions, napthalene dicarboxylic acids, 1,3-propanediol groups, and combinations thereof.

(b) from 0.01 to 95 wt. % of a member selected from the group consisting of (1) fillers, (2) carboxy reactive materials (3) polyalkylene terephthalates, (4) polycarbonates and an impact modifiers, (5) impact modifiers, (6) polycarbonates, and (7) combinations thereof;

wherein the isophthalic acid is present in an amount ranging from 0.1 to 10 mole % and wherein the article has at least one wall having a thickness ranging from 0.1 mm to 2000 mm;

wherein the article is selected from the group consisting of injection molded articles, thermoformed articles, extruded articles, pultruded articles, rotationally molded articles, and blow molded articles.

The articles made in accordance with embodiments of the invention can exhibit properties that are useful for commercial applications. In one embodiment, an article made from a molding composition containing the modified polybutylene terephthalate derived from polyethylene terephthalate exhibits improved flow properties, as compared to compositions made with virgin PBT. For instance, the flow of a molding composition containing the PET-derived modified polybutylene terephthalate can exhibit a melt volume rate that is at least 10% more than the melt volume rate of an article made from a molding composition containing monomer-derived polybutylene terephthalate. In another embodiment, the melt volume rate of an article made from a molding composition containing monomer-derived polybutylene terephthalate can be from 10 to 30% more, as compared to a composition made from monomer-derived polybutylene terephthalate.

The improved flow properties can be beneficial, because they can lower the cycle times for making articles.

The invention provides numerous previously unavailable advantages over articles derived from compositions made from conventional processes that use monomer-based compositions.

The process for making the PET-derived random, modified PBT copolymers, for instance, can advantageously reduce carbon dioxide emissions and carbon waste. Since the PET-derived polyester random modified PBT copolymers made by the inventive process are made from PET and not monomers, the process significantly reduces the amount of carbon dioxide emissions and carbon waste. Carbon waste reduction occurs because the carbon that constitutes the dimethyl terephthalate or terephthalic acid ordinarily used to make polyesters is not used, rather a PET component, e.g., polyester scrap, is replaced. In one embodiment, the process for making PET-derived modified PBT can eliminate at least 1 kg of $CO_2$ emissions for every kilogram of PET-derived modified PBT made with the process, as compared to a process that makes virgin PBT homopolymers from monomers. In another embodiment, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, the energy required to make dimethyl terephthalate or terephthalic acid is not required, thereby leading to carbon dioxide savings. Additionally, there are energy savings/reduced carbon dioxide emissions when the ethylene glycol by-product is recovered and is used instead of ordinary ethylene glycol in manufacturing.

An article made from a molding composition containing modified polybutylene terephthalate random copolymers can have a reduced $CO_2$ emissions index. The reduced $CO_2$ emissions index, as defined in this application, is the amount of $CO_2$, expressed in kg, that is saved when one (1) kg of a composition containing the modified polybutylene terephthalate random copolymers is made, compared to the amount of $CO_2$, expressed in kg, that is created when the composition is made with polybutylene terephthalate that is made with standard processes (derived from monomers). Generally, our articles generally have a reduced $CO_2$ emissions index that is more than approximately 0.06 kg, and can range from 0.06 kg to 2.5.

The basis for this feature is discussed below. The difference between the amount of $CO_2$ that is created during ordinary processes for making virgin, monomer-derived PBT and the process for making the modified polybutylene terephthalate random copolymers can range from 1.3 kg to 2.5 kg, or more suitably from 1.7 to 2.2. In other words, the process for making the modified polybutylene terephthalate random copolymers creates 1.3 to 2.5 kilograms less $CO_2$, as compared to the process for making virgin PBT.

These results can be derived and verified by using material and energy balance calculations (calculations that are well know in the chemical engineering art) and comparing the amount of energy used to make modified PBT random copolymers from PET and the amount of energy used to make PBT from terephthalic acid.

To determine the ranges of the reduced $CO_2$ emissions index for our articles, (which are made from compositions having the modified PBT random copolymers present in an amount ranging from 5 to 99.99 wt %), the $CO_2$ reduction index can be calculated by multiplying the lower amount of the polybutylene butylene terephthalate present in the composition used to make an article, in percentage terms, with 1.3 (0.05×1.3=0.065) and the higher amount of the polytbutylene terephthalate times 2.5. (0.9999×2.5=2.4999).

Accordingly, since articles use materials that are made from polymers, e.g., polyethylene terephthalate, instead of monomers, the invention provides a novel solution of how to reduce the amount of PET being buried in landfills or incinerated. In other words, the invention can provide a valuable way to meet the unmet need to effectively use underutilized scrap PET in PBT thermoplastic molding compositions. The invention can provide an effective use of post consumer or post-industrial streams. Further, the invention can conserve our non-renewable resources and reduce the formation of greenhouse gases, e.g., $CO_2$. Articles having such properties can also help many customers who are increasingly being asked for products that use renewable resources or that reduce $CO_2$ emissions.

The invention is further described in the following illustrative examples in which all parts and percentages are by weight unless otherwise indicated.

EXAMPLES

Examples 1-12

Overview

In these Examples, various articles were made from molding compositions as indicated below. Articles were made from both virgin, monomer-based polybuytlene terephthalate and polybuytlene terephthalate containing polyethylene terephthalate residues (derived from polyethylene terephthalate).

Materials

The following table gives a list of the ingredients used in the examples of the inventions.

extruder has 8 independent feeders for different raws and can be operated at a maximum rate of 300 lbs/hr. The extrudate was cooled through a water bath prior to pelletizing. Test parts were injection molded on a van Dorn molding machine with a set temperature of approximately 240° C. to 265° C. The pellets were dried for 3-4 hours at 120° C. in a forced air circulating oven prior to injection molding.

Testing Protocol for Molding Compositions

The following testing protocol was used to test parts made from molding compositions, as indicated below.

Melt Volume Rate (MVR) on pellets (dried for 2 hours at 120° C. prior to measurement) was measured according to ISO 1133 method at dwelling time of 240 seconds and 0.0825 inch (2.1 mm) orifice.

| Abbreviation | Description |
|---|---|
| PET Derived PBT, (0.66 iv) | Poly(1,4-butylene terephthalate) derived from PET, intrinsic viscosity of 0.66 cm3/g as measured in a 60:40 phenol/tetrachloroethane mixture |
| PET Derived PBT, (1.2 iv) | Poly(1,4-butylene terephthalate) derived from PET,, intrinsic viscosity of 1.2 cm3/g as measured in a 60:40 phenol/tetrachloroethane mixture. |
| GE PBT 195 (0.66 iv) | Poly(1,4-butylene terephthalate) from General Electric Company, intrinsic viscosity of 0.66 cm3/g as measured in a 60:40 phenol/tetrachloroethane mixture |
| GE PBT 315 (1.2 iv) | Poly(1,4-butylene terephthalate) from General Electric Company, intrinsic viscosity of 1.2 cm3/g as measured in a 60:40 phenol/tetrachloroethane mixture. |
| Ultratalc 609 | Ultrafine ground functional talc-60% SiO2; 32% MgO, average particle size less than 0.9 microns, from Stochem Co. |
| TSAN | 50/50 wt % polytetrafluoroethylene blended with poly(styrene-co-acrylonitrile) from General Electric Co. |
| Lotader AX8900 | Random Terpolymer of Ethylene (E), Acrylic Ester (AE) and Glycidyl Methacrylate Ester (GMA) from Arkema |
| GE MBS | Methacrylate-Butadiene-Styrene emulsion copolymer impact modifier with core-shell structure from General Electric Co. |
| Seenox 412S | Thioester, Pentaerythritol tetrakis(3-(dodecylthio)propionate) sold as SEENOX 412-S from Crompton |
| IRAGANOX 1010 | Hindered Phenol, Pentaerythritol tetrakis(3,5-di-tert-butyl-4-hydroxyhydrocinnamate) sold as IRAGANOX 1010 from Ciba Geigy |
| IRGAPHOS 168 | Phosphite, 2,4-di-tert-butylphenol phosphite (3:1) sold as IRGAPHOS 168 from Ciba Geigy |
| Irgonox1076 | Hindered Phenol Heat Stabilizer, Octadecyl 3-(3,5-di-tert-butyl-4-hydroxyphenyl)propionate sold as IRGANOX 1076 from Ciba Geigy |
| ERL4221 | 3,4-epoxycyclohexylmethyl-3-4-epoxy-cyclohexyl carboxylate for DOW Chemical |
| NaSt | Sodium Stearate |
| PETS | pentaerythritol tetrastearate |
| MBS-RH | Methacrylate-Butadiene-Styrene emulsion copolymer impact modifier with core-shell structure. From Rohm & Haas EXL2691 |
| Acrylic Impact modifier | Acrylic impact modifier from Rohm and Haas EXL3330, Emulsion copolymer of methacrylate-butyl acrylate with core-shell structure. |
| PC100 | PC bisphenol polycarbonate Lexan ® resin from General Electric Company. Mn by GPC againt polystyrene standards is 29 Kg/mol. |
| PC 120 | PC bisphenol polycarbonate Lexan ® resin from General Electric Company. Mn by GPC againt polystyrene standards is 24 Kg/mol. |
| PC 130 | PC bisphenol polycarbonate Lexan ® resin from General Electric Company. Mn by GPC againt polystyrene standards is 36 Kg/mol. |
| PC 140 | PC bisphenol polycarbonate Lexan ® resin from General Electric Company. Mn by GPC againt polystyrene standards is 27 Kg/mol. |
| PC 175 | PC bisphenol polycarbonate Lexan ® resin from General Electric Company. Mn by GPC againt polystyrene standards is 22 Kg/mol. |
| Pentaerythritol | Tetrakis(hydroxymethyl)methane; 2,2-Bis-(hydroxymethyl)-1,3-propanediol |
| THAM | Trishydroxymethyl aminomethane as purchased from Aldrich Chemical Company, USA. |
| Glass Fiber | E glass with diameter of 10 or 13 um. Sizing-coated glass fibers are commercially available from Owens Corning Fiberglass as, for example, OCF K filament glass fiber 183F. |
| PEP-Q | Tetrakis(2,4-di-tert-butylphenyl)4,4'-biphenylene diphosphonite, SANDOSTAB PEPQ from Clariant Chemicals. |
| S2001 | Core-shell type impact modifier with silicone-acrylic-based rubber, METABLEN S-2001 from Mitsubishi Rayon. |
| Sb2O3/EVA | 85% Antimony oxide (Sb2O3) concentrate in Ethylene vinyl acetate |
| VHRG Resin | MethylMethacrylate Acrylonitrile Butadiene Styrene Copolymer from GE |
| Branched PC Resin | Branched Polycarbonate Lexan ® Resin from General Electric Company. Mn by GPC against polystyrene standards is 37 kg/mol |

Procedure to Make Molding Compositions

The following procedure was used to make the molding compositions in the examples. The ingredients of the examples shown below in Tables, were extruded on a 40 mm Werner Pfleiderer Twin Screw Extruder with a vacuum vented mixing screw, at a barrel and die head temperature between 240 and 265 degrees C. and 300 rpm screw speed. The Capillary viscosity, which is another indicator of melt-flow was measured by ASTM D3835 or ISO D11433. Dried pellets were extruded through a capillary Rheometer and the force at varied shear rates was determined to estimate the shear viscosity.

Tensile properties were tested according to ISO 527 on 150×10×4×mm (length×wide×thickness) injection molded bars at 23° C. with a crosshead speed of 5 mm/min. Izod unnotched impact was measured at 23° C. with a pendulum of 5.5 Joule on 80×10×4 mm (length×wide×thickness) impact bars according to ISO 180 method. Flexural properties or three point bending were measured at 23° C. on 80×10×4 mm (length×wide×thickness) impact bars with a crosshead speed of 2 mm/min according to ISO 178.

In other cases, injection molded parts were tested by ASTM. Notched Izod testing as done on 3×½×⅛ inch (76.2× 12.7×3.2 mm) bars using ASTM method D256. Bars were notched prior to oven aging, samples were tested at room temperature. Tensile elongation at break was tested on 7×⅛ in. (177.8×3.3 mm) injection molded bars at room temperature with a crosshead speed of 2 in./min (50.8 mm/min) for glass filled samples and 0.2 in/min (5.08 mm/min) for unfilled samples by using ASTM D648. Flexural properties were measured using ASTM 790 or ISO 178 method. Biaxial impact testing, sometimes referred to as instrumented impact testing, was done as per ASTM D3763 using a 4×⅛ inch (101.6×3.2 mm) molded discs. The total energy absorbed by the sample is reported as ft-lbs or J. Testing was done at room temperature on as molded or oven aged samples. Heat Deflection Temperature was tested on five bars having the dimensions 5×0.5×0.125 inches (127×12.7×3.2 mm) using ASTM method D648.

Example 1

A modified polybutylene terephthalate random copolymer was derived from polyethylene terephthalate as follows. Clear PET bottle scrap was obtained from a commercial source. In the scrap cleaning process, the PET scrap was cleaned manually involving first a hot water wash followed by manual sorting to separate colored bottles and PVC bottles, crushing, hydrofloatation to separate PP, labels, caps etc., alkali wash to remove glue, and finally a demineralized water wash to remove alkali followed by drying. The resulting PET flakes were used as the main raw material in the depolymerization step. The post consumer recycle PET flakes had an iv specification of 0.68 to 0.78 dl/g and a melting point specification of 245 to 255 C. The PVC content was less than 10 ppm by specification. The butanediol was obtained from BASF and had a purity specification of >99.5 wt. %. The ethylene glycol was obtained from Merck and had a purity specification of >99.5 wt. %. The TPT catalyst used was the commercial Tyzor grade available from Dupont.

Depolymerization (Glycolysis) with Ethylene Glycol—Preparation of First Mixture

Depolymerization of PET flakes was carried out at a mole ratio of PET ('mer' repeat unit) to EG in the ratio ranging from 1:0.8 to 1:2.0 to make the depolymerization product. The reaction was conducted in the presence of catalyst (titanium, antimony or tin compounds (ranging from 50 to 125 ppm)) or without any added catalyst. The process was carried out under a pressure in the range 1.0 bar-6 bar and at a temperature of 200° C. to 260° C.). The total time of depolymerization was from 20 to 120 min and preferably from 30 to 100 min. This was further followed by filtration of the mass to remove black specs and other insoluble impurities. The resulting mass was called the first mixture. The depolymerization reaction conditions employed was as presented in Table 1.

TABLE 1

| Example No. | Pressure (kPa) | Temperature ° C. | Depolymerization time (min) |
|---|---|---|---|
| 1 | 350 | 230 | 95 |

Transesterification—Preparation of Second Mixture (at Atmospheric Pressure)

Transesterification was done by reacting the first mixture with BDO with or without cocatalyst. The BDO was taken in excess over the stoichiometric requirement and the mole ratio of excess to stoichiometric requirement was in the range from 2.0 to 4.0. The reaction was conducted in the presence of additional amount of catalyst (50-120 ppm of Ti, Sn or Sb catalysts or combinations thereof) at temperature ranging from 200 to 245° C. and more preferably from 210 to 235° C. at atmospheric pressure for 10-40 min and more preferably 15-30 min. During this period, the vapors were passed through a distillation column wherein the EG and THF were removed after separation from BDO which was refluxed back into the reactor. This resulted in the reaction mass called second mixture. The second mixture was not characterized and the reaction was continued as given below to form the third mixture.

Preparation of Third Mixture (at Pressures in the Range from 95 kPa to 50 kPa)

The second mixture was subjected to a pressure initially in the range of 95 to 80 kPa for a period of 10-40 min and more preferably 15-30 min. During this period, the temperature was controlled between 190 and 235° C. and more preferably between 190 and 220° C. and the vapors were subjected to distillation and much of the BDO of condensed vapors was refluxed back accompanied by the removal of EG, THF and minor amounts of BDO. At this stage, 80% of total EG present both as free and as bound was removed by distillation during transesterification. Subsequently, the pressure was reduced gradually to a range of 75 to 50 kPa and the temperature was maintained between 190 and 235° C. and more preferably between 190 and 220° C. The total time for transesterification was maintained between 30 to 150 min and preferably between 90 to 120 min. EG, THF and minor amount of BDO were removed by distillation and as before, much of the BDO was continuously refluxed back into the reactor. This resulted in the formation of a third mixture. The reaction conditions employed and the amounts of various ingredients collected in the distillate at the end of transesterification were as shown in Table 2.

TABLE 2

| | | | | Distillate composition | | | | |
|---|---|---|---|---|---|---|---|---|
| Example | Pressure kPa | Temp ° C. | Time min | THF Wt % | WATER Wt % | EG Wt % | BDO Wt % | Qty of OVHD g |
| 1 | Atm, 80, 50 | 191-219 | 65, 30, 30 | 14.38 | 7.18 | 56.36 | 22.08 | 8430 |

Recycling the BDO enabled a favorable BDO to EG ratio in the transesterification reactor and also improved productivity by lowering the transesterification time. EG was reused in the depolymerization step and BDO was reused in the transesterification step. The THF and water mixture were sent to storage vessels.

Polycondensation using the third mixture was carried out at a temperature ranging from 230 to 265° C. and preferably from 245 to 255° C. The pressure was gradually reduced to a level of 0.01 kPa to 1 kPa to enable molecular weight build-up. The reaction was conducted within a time span of 45 to 120 min and preferably 45 to 75 min. During polycondensation, excess BDO and residual EG were removed, along with THF and Water. The vapour byproducts were subjected to distillation to separate EG, BDO, THF and water mixture. The final polymer product (PBT) had a I.V. ranging from 0.5 to 1.5 dl/gm and EG content less than 0.5 wt % each based on final polymer. Typically, the IPA content was less than 2% in the polymer. The melting point of the final polymer was in the range from 215 to 222° C. The experimental conditions used for polycondensation and the composition of the distillates were as shown in Table 3.

TABLE 3

| Example | Press kPa | Temp ° C. | Time min | Overhead Distillate composition | | | | Qty of overhead, g |
| --- | --- | --- | --- | --- | --- | --- | --- | --- |
| | | | | THF Wt % | Water Wt % | EG Wt % | BDO Wt % | |
| 1 | 50-0.13 | 252 | 63 | 1.755 | 6.07 | 30.72 | 61.45 | 1634 |

The results produced a modified polybutylene terephthalate random copolymer containing residues from the polyethylene terephthalate. The modified polybutylene terephthalate was subjected to solid state polymerization. The modified PBT was subjected to a vacuum, placed in a tumbling reactor, and subjected to a temperature ranging from 150 to 210 C for a period ranging from 10 to 48 hours.

Examples 2-3

In these Examples, a talc filled composition was made with a polybutylene terephthalate copolymer derived from polyethylene terephthalate (as prepared in accordance to Example 1) and polybutylene terephthalate derived from monomers.

Materials

Table 4 shows the ingredients and concentrations used. All compositions are in weight %.

TABLE 4

| Description | Unit | 2 | 3 (Comparative) |
| --- | --- | --- | --- |
| PET Derived PBT (0.66 iv) | % | 41.16 | |
| PET Derived PBT (1.2 iv) | % | 17.5 | |
| GE PBT 315 (0.66 iv) | % | | 41.16 |
| GE PBT 195 (1.2 iv) | % | | 17.5 |
| Talc | % | 20 | 20 |
| Low-IV, Fast-Crystallizing PET | % | 20 | 20 |
| Hindered Phenol Stabilizer | % | 0.04 | 0.04 |
| SAPP-Technical-Food Grade | % | 0.1 | 0.1 |
| Alkane SO3Na Antistatic Pellet | % | 1 | 1 |
| Pentaerythritol Tetrastearate | % | 0.2 | 0.2 |

Composition Preparation Procedure

The ingredients of the examples shown below in the indicated tables were extruded on a 40 mm Werner Pfleiderer Twin Screw Extruder with a vacuum vented mixing screw, at a barrel and die head temperature between 240 and 265 degrees C. and 150 to 300 rpm screw speed. The extruder had 8 independent feeders for different raws and can be operated at a maximum rate of 300 lbs/hr (136 kg/hr). The extrudate was cooled through a water bath prior to pelletizing. Test parts were injection molded on a van Dorn molding machine with a set temperature of approximately 240 to 265° C. The pellets were dried for 3-4 hours at 120° C. in a forced air circulating oven prior to injection molding.

Articles Preparation Procedure

Articles, standard parts, were made from the compositions and tested in accordance as indicated above. The properties obtained for articles made from these molding compositions are shown in Table 5. The properties listed below were not measured on the articles. These are properties on standard parts made from the same composition that was used to make the article.

TABLE 5

| PROPERTY | UNITS | 2 | 3 (Comparative) |
| --- | --- | --- | --- |
| Flexural Modulus (ASTM) | Mpa | 4610 | 4520 |
| Flexural Modulus (ISO) | Mpa | 4670.6 | 4582.8 |
| Deflection temp, 1.82 MPa (ASTM) | ° C. | 76 | 80 |
| Deflection temp, Flat, 1.8 MPa (ISO) | ° C. | 74 | 74 |
| Deflection temp, 0.455 MPa (ASTM) | ° C. | 182 | 188 |
| Deflection temp, 0.456 MPa (ISO) | ° C. | 167 | 174 |
| Tensile Modulus (ASTM) | Mpa | 4610 | 4040 |
| Tensile Stress at Yield (ASTM) | Mpa | 55 | 57 |
| Tensile Stress at Break (ASTM) | Mpa | 55 | 57 |
| Tensile Elongation at Yield (ASTM) | % | 2.2 | 2.5 |
| Tensile Elongation at Break (ASTM) | % | 2 | 3 |
| Tensile Modulus (ISO) | Mpa | 4362 | 4281 |
| Tensile Stress at Yield (ISO) | Mpa | 52 | 55 |
| Tensile Stress at Break (ISO) | Mpa | 52 | 55 |
| Tensile Strain at Yield (ISO) | % | 1.9 | 2.2 |

TABLE 5-continued

| PROPERTY | UNITS | 2 | 3 (Comparative) |
|---|---|---|---|
| Tensile Strain at Break (ISO) | % | 2 | 2 |
| Notched IZOD Impact Strength (ISO) | kJ/m2 | 3 | 3 |
| Notched IZOD Impact Strength (ASTM) | J/m | 36 | 32 |
| Un-Notched IZOD Impact Strength (ASTM) | J/m | 346 | 373 |
| Multiaxial Impact Total Energy, 2.3 m/s, RT (ASTM) | J | 5 | 5 |
| Multiaxial Impact Total Energy, 2.3 m/s, −40 C. (ASTM) | J | 4 | 5 |
| Charpy Impact strength, RT (ISO) | kJ/m2 | 8 | 9 |
| Density-ISO 1183 | g/cm$^3$ | 1.46 | 1.46 |
| Shrinkage Parallel, 120 C. | % | 1.85 | 1.96 |
| Shrinkage Perpendicular | % | 2.16 | 2.26 |
| MVR, 250 C., 2.16 Kg, 240 s (ISO) | cm$^3$/10 min | 72 | 49 |
| MFR, 250 C., 2.16 Kg, 360 s (ASTM) | g/10 min | 102 | 67 |
| Vicat Softening Temp, 50N, 120 C./hr (ISO) | ° C. | 173 | 183 |
| CTE, Flow (ISO) | μm/m-° C.) | 47.9 | 47.7 |
| CTE, cross Flow (ISO) | μm/m-° C.) | 90.9 | 91.4 |

Examples 4-5

In these Examples, compositions containing elastomers were made with a polybutylene terephthalate copolymer derived from polyethylene terephthalate (as prepared in accordance to Example 1) and polybutylene terephthalate derived from monomers, respectively.

Materials

Table 3 shows the ingredients and concentrations used in Example 2, which is an elastomer containing molding composition. All compositions are in weight %.

TABLE 6

| Description | Unit | 4 | 5 (Comp) |
|---|---|---|---|
| PBT 315 (1.2 iv) | % |  | 56.4 |
| PBT 195 (0.66 iv) | % |  | 40 |
| PET Derived PBT (0.66 iv) | % | 40 |  |
| PET Derived PBT (1.2 iv) | % | 56.4 |  |
| Dupont Elastomer Hytrel 4056 | % | 3 | 3 |
| Hindered Phenol Stabilizer | % | 0.2 | 0.2 |
| Pentaerythritol Diphosphite | % | 0.1 | 0.1 |
| Pentaerythritol Tetrastearate | % | 0.3 | 0.3 |

The above-mentioned ingredients were extruded on a 40 mm Werner Pfleiderer Twin Screw Extruder with a vacuum vented mixing screw, at a barrel and die head temperature between 240 and 265 degrees C. and 150 to 300 rpm screw speed. The extruder had 8 independent feeders for different raws and can be operated at a maximum rate of 300 lbs/hr. The extrudate was cooled through a water bath prior to pelletizing. Test parts were injection molded on a van Dorn molding machine with a set temperature of approximately 240 to 265° C. The pellets were dried for 3-4 hours at 120° C. in a forced air circulating oven prior to injection molding.

Results

The physical properties obtained from articles made from these molding compositions are shown in Table 7.

TABLE 7

| PROPERTY | UNITS | 4 | 5 (Comparative) |
|---|---|---|---|
| Flexural Modulus (ASTM) | Mpa | 2370 | 2400 |
| Flexural Modulus (ISO) | Mpa | 2172 | 2261 |
| Deflection temp, 1.82 MPa (ASTM) | ° C. | (50) | (51) |
| Deflection temp, Flat, 1.8 Mpa (ISO) | ° C. | 46 | 50 |
| Deflection temp, 0.455 MPa (ASTM) | ° C. | 144 | 143 |
| Deflection temp, 0.456 MPa (ISO) | ° C. | (118) | (131) |
| Tensile Modulus (ASTM) | Mpa | 2670 | 2550 |
| Tensile Stress at Yield (ASTM) | Mpa | 56 | 56 |
| Tensile Stress at Break (ASTM) | Mpa | 25 | 26 |
| Tensile Elongation at Yield (ASTM) | % | 3.7 | 4.0 |
| Tensile Elongation at Break (ASTM) | % | 142 | 131 |
| Tensile Modulus (ISO) | Mpa | 2330 | 2513 |
| Tensile Stress at Yield (ISO) | Mpa | 55 | 56 |
| Tensile Stress at Break (ISO) | Mpa | 32 | 29 |
| Tensile Strain at Yield (ISO) | % | 3.4 | 6.5 |
| Tensile Strain at Break (ISO) | % | 93 | 74 |
| Notched IZOD Impact Strength (ISO) | kJ/m$^2$ | 4 | 5 |
| Notched IZOD Impact Strength (ASTM) | J/m | 42 | 52 |
| Un-Notched IZOD Impact Strength (ASTM) | J/m | 850 | 850 |
| Multiaxial Impact Total Energy, 2.3 m/s, RT (ASTM) | J | 53 | 56 |
| Multiaxial Impact Total Energy, 2.3 m/s, −40 C. (ASTM) | J | 55 | 39 |
| Charpy Impact strength, RT (ISO) | kJ/m$^2$ | 9 | 10 |
| Density-ISO 1183 | g/cm$^3$ | 1.3 | 1.3 |
| Shrinkage Parallel, 120 C. | % | 2.5 | 2.5 |
| Shrinkage Perpendicular | % | 2.6 | 2.6 |
| MVR, 250 C., 2.16 Kg, 240 s (ISO) | cm$^3$/10 min | 33.8 | 26 |
| MFR, 250 C., 2.16 Kg, 360 s (ASTM) | g/10 min | 63.8 | 38.3 |
| Vicat Softening Temp, 50N, 120 C./hr (ISO) | ° C. | 164 | 175 |
| CTE, Flow (ISO) | μm/(m-° C.) | 84 | 81 |
| CTE, cross Flow (ISO) | μm/(m-° C.) | 87 | 89 |

In both the above examples, an interesting trend was observed. A marginal decrease in the heat deflection temperature is observed and an increase in the MVR was observed (for the PET derived PBT). The PET derived PBT thus offers a unique handle to balance the heat properties and the flow properties of the molding composition.

In all other respects, the PET derived PBT molding composition exhibits properties that are very similar to the virgin PBT based molding composition. This is a unique advantage since the PET residues do not affect a majority of the physical properties of the PBT made by this route. The conventional mode of recycling PBT is to collect used or rejected parts, regrind and remold to make new parts. However, via the conventional process, the quality of the final parts obtained suffers from a loss of physical properties. The PET derived PBT is a convenient recycle technology that lends virgin-like physical properties to molding compositions and articles made from them.

Examples 6-7

In these Examples, compositions containing polycarbonate and impact modifier were made with a polybutylene terephthalate copolymer derived from polyethylene terephthalate (as prepared in accordance to Example 1) and polybutylene terephthalate derived from monomers, respectively.

Materials

Table 8 shows the ingredients and concentrations used in Example 6, which is a polycarbonate and impact modifier containing molding composition. The letter designates the comparative composition made with 'virgin' PBT. All compositions are in weight %.

TABLE 8

| Item Description | Unit | Example 6 | Example 7 Comparative |
|---|---|---|---|
| POLYCARBONATE 105, 100 GRADE POWDER | % | 1 | 1 |
| GE PBT 315, 1.2 iv | % |  | 37.3 |
| SEENOX 412S pentaerythritol betalaurylthiopropionate | % | 0.2 | 0.2 |
| PHOSPHOROUS ACID 45% | % | 0.05 | 0.05 |
| HINDERED PHENOL ANTI-OXIDANT | % | 0.2 | 0.2 |
| GE MBS (C682434-1000) dusted with 5% PC powder | % | 15.2 | 15.2 |
| PET Derived PBT, 1.2 iv | % | 37.3 |  |
| POLYCARBONATE 101-111N | % | 46.05 | 46.05 |
|  |  | 100 | 100 |

Composition Preparation Procedure

The above-mentioned ingredients were extruded on a 40 mm Werner Pfleiderer Twin Screw Extruder with a vacuum vented mixing screw, at a barrel and die head temperature between 240 and 265 degrees C. and 150 to 300 rpm screw speed. The extruder had 8 independent feeders for different raws and can be operated at a maximum rate of 300 lbs/hr. The extrudate was cooled through a water bath prior to pelletizing. Test parts were injection molded on a van Dorn molding machine with a set temperature of approximately 240 to 265° C. The pellets were dried for 3-4 hours at 120° C. in a forced air circulating oven prior to injection molding.

Results

The compositions were tested in accordance to the testing protocol indicated above. The properties obtained on standard parts made from the compositions shown above are listed in Table 9.

TABLE 9

|  |  | Example 6 | Example 7 (Comparative) |
|---|---|---|---|
| Flexural Modulus | MPa | 2010 | 1970 |
| Flexural Modulus | MPa | 1818 | 1771 |
| Deflection temp, 1.82 MPa | ° C. | 79 | 84 |
| Deflection temp, Flat, 1.8 Mpa | ° C. | 72 | 79 |
| Deflection temp, 0.455 | ° C. | 102 | 108 |
| Deflection temp, 0.456 | ° C. | 99 | 104 |
| Modulus | MPa | 1920 | 1890 |
| Stress at Yield | MPa | 50 | 49 |
| Stress at Break | MPa | 51 | 49 |
| Elongation at Yield | % | 4 | 5 |
| Elongation at Break | % | 150 | 139 |
| Modulus | MPa | 2066 | 2024 |
| Stress at Yield | MPa | 50 | 49 |
| Stress at Break | MPa | 47 | 48 |
| Strain at Yield | % | 4 | 4 |
| Strain at Break | % | 147 | 142 |
| Notched IZOD Impact Strength | kJ/m2 | 53 | 54 |
| Notched IZOD Impact Strength | J/m | 719 | 676 |
| Un-Notched IZOD Impact Strength | J/m | 850 | 850 |
| Total Energy, 2.3 m/s, RT | J | 50 | 52 |
| Total Energy, 2.3 m/s, −40 C. | J | 60 | 64 |
| Impact strength, RT | kJ/m2 | 63 | 59 |
| Density-ISO 1183 | g/cm$^3$ | 1 | 1 |
| Shrinkage Parallel, 120 C. | % | 2 | 2 |
| Shrinkage Perpendicular | % | 2 | 1 |
| MVR, 250 C., 2.16 Kg or 5 Kg for 1103, 240 s | cm$^3$/10 min | 16 | 14 |
| MFR, 250 C., 2.16 Kg 5 Kg for 1103, 360 s | g/10 min | 16.0 | 14 |
| Softening Temp, 10N, 50 C./hr (K3501); others 50N 120 C. | ° C. | 116 | 122 |
| CTE, Flow | um/(m-° C.) | 82 | 87 |
| CTE, cross Flow | um/(m-° C.) | 84 | 90 |

In the above examples, it is seen that the molding composition obtained from the PET derived PBT offered similar properties as that of the composition derived from monomer based PBT. This is a unique advantage since the PET residues do not affect a majority of the physical properties of the PBT made by this route. The conventional mode of recycling PBT is to collect used or rejected parts, regrind and remold to make new parts. However, via the conventional process, the quality of the final parts obtained suffers from a loss of physical properties. The PET derived PBT is a convenient technology that will lend virgin-like physical properties to molding compositions and articles made from them.

Examples 8-9

In these Examples, connectors were made from compositions containing virgin, monomer-derived PBT and PBT copolymers containing PET residues.

Materials

The materials shown below were used and compositions containing virgin, monomer-derived PBT and PBT copolymers containing PET residues were made in accordance to the procedure of Examples 4 and 5. Table 10 indicates the respective compositions and amounts.

TABLE 10

| Description | Unit | 8 | 9 (Comp) |
|---|---|---|---|
| PBT 315 (1.2 iv) | % |  | 56.4 |
| PBT 195 (0.66 iv) | % |  | 40 |
| PET Derived PBT (0.66 iv) | % | 40 |  |
| PET Derived PBT (1.2 iv) | % | 56.4 |  |
| Dupont Elastomer Hytrel 4056 | % | 3 | 3 |
| Hindered Phenol Stabilizer | % | 0.2 | 0.2 |
| Pentaerythritol Diphosphite | % | 0.1 | 0.1 |
| Pentaerythritol Tetrastearate | % | 0.3 | 0.3 |

Preparation Procedure to Make Connector Article

Connectors were made from the compositions described in Table 8. Each connector was injection molded on a four cavity connector tool with two subgates per part. The machine used to mold the connector tool was a Sumitomo 350 ton machine with a barrel capacity of 15 ounces (443.6 cm$^3$). The mold orifice had a diameter of 7/32 inches (0.55 cm). The melt was maintained at a temperature of 503° F. (261° C.) and the mold temperature was maintained at 170° F. (77° C.). The resin was dried at 240° F. (115° C.) for 6 hours prior to molding.

Results

The injection pressure requirement was found to be approximately 17% LESS for the connector molded from Example 9 (PET derived PBT) as compared to the article molded from the composition containing the virgin, monomer-based PBT.

FIG. 1 shows connectors made as described above. Each connector article had dimensions of about 1.5×1.5×1 inch (3.8×3.8×2.5 cm) and the wall had a thickness of about 0.125 inches (0.32 cm). This approach can be extended towards making a variety of different connectors of varied dimensions.

Examples 10-11

In these Examples, bezels were made from compositions containing virgin, monomer-derived PBT and PBT copolymers containing PET residues.

Materials

The materials shown below were used and compositions containing virgin, monomer-derived PBT and PBT copolymers containing PET residues were made in accordance to the procedure of Examples 2 and 3. Table 11 indicates the respective compositions and amounts.

TABLE 11

| Description | Unit | 10 | 11 (Comparative) |
|---|---|---|---|
| PET Derived PBT (0.66 iv) | % | 41.16 | |
| PET Derived PBT (1.2 iv) | % | 17.5 | |
| GE PBT 315 (0.66 iv) | % | | 41.16 |
| GE PBT 195 (1.2 iv) | % | | 17.5 |
| Talc | % | 20 | 20 |
| Low-IV, Fast-Crystallizing PET | % | 20 | 20 |
| Hindered Phenol Stabilizer | % | 0.04 | 0.04 |
| SAPP-Technical-Food Grade | % | 0.1 | 0.1 |
| Alkane SO3Na Antistatic Pellet | % | 1 | 1 |
| Pentaerythritol Tetrastearate | % | 0.2 | 0.2 |

Procedure to Make Bezels

A bezel was made from each of the compositions shown in Table 9. Each bezel was injection molded on a two cavity tool with an edge gate and a cold runner. The machine used to mold the bezel was a Husky 550 ton. The melt was maintained at a temperature of 500° F. (260° C.) and the mold temperature was maintained at 170° F. (77° C.). The resin was dried at 240° F. (115° C.) for 6 hours prior to molding.

Results

Figure 2:
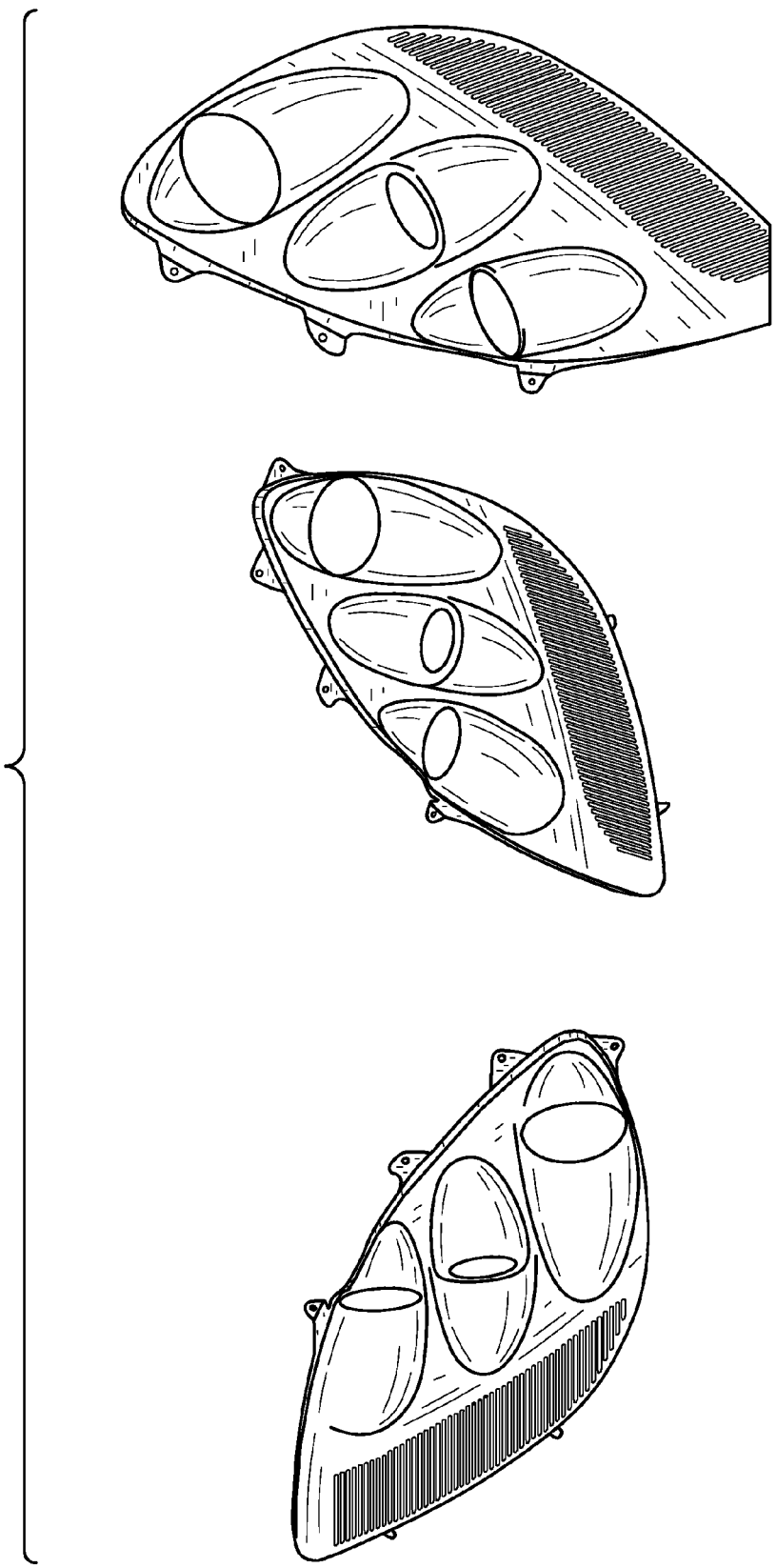
FIG. 2 is a set of views showing a bezel being made in accordance with the invention.

Each bezel has dimensions of about 38 cm×43 cm×14 cm and a thickness of 0.31 cm. This bezel had 3 circular slots of diameters 6.35, 5.72 and 8.9 cms respectively for the headlamps. FIGS. 2(a), 2(b), and 2(c) show different views of the bezel that was molded from molding compositions with PBT containing PET residues.

Advantageously, the injection pressure requirement for Example 9 was found to be less by 5% versus example 10. This means that the bezel made from the composition containing PBT random copolymers containing PET residues required less energy than the bezel made from the composition containing monomer-derived PBT. For a manufacturer who makes such articles in a large scale, the energy savings can be significant. This approach can also be extended towards making a variety of automotive bezels of different shapes and dimensions.

Example 12

In this Example, an energy absorber was made from compositions containing virgin, monomer-derived PBT and PBT copolymers containing PET residues.

Materials

The materials shown below were used and a molding compositions containing virgin, monomer-derived PBT and PBT copolymers containing PET residues were made in accordance to the procedure of Examples 6 and 7. Table 12 indicates the respective compositions and amounts.

TABLE 12

| Item Description | Unit | Example 6 | Example 7 Comparative |
|---|---|---|---|
| POLYCARBONATE 105, 100 GRADE POWDER | % | 1 | 1 |
| GE PBT 315, 1.2 iv | % | | 37.3 |
| SEENOX 412S pentaerythritol betalaurylthiopropionate | % | 0.2 | 0.2 |
| PHOSPHOROUS ACID 45% | % | 0.05 | 0.05 |
| HINDERED PHENOL ANTI-OXIDANT | % | 0.2 | 0.2 |
| GE MBS (C682434-1000) dusted with 5% PC powder | % | 15.2 | 15.2 |
| PET Derived PBT, 1.2 iv | % | 37.3 | |
| POLYCARBONATE 101-111N | % | 46.05 | 46.05 |
| | | 100 | 100 |

Procedure to Make Energy Absorbers

Energy Absorbers (EA) were made from each of the compositions shown in Table 12. Each EA was injection molded on a single cavity aluminum tool with direct gate and a hot runner. The machine used to mold the EA was a Husky 1350 ton. The melt was evaluated at 510° F. (268° C.) and 520° F. (271° C.) and the mold temperature was maintained at 160° F. (77° C.). The resin was dried at 240° F. (115° C.) for 6 hours prior to molding.

Results

Each EA had dimensions of about 60 in×4 in×4 in (152 cm×10.2 cm×cm) and a thickness of 3 mm.

Figure 3:
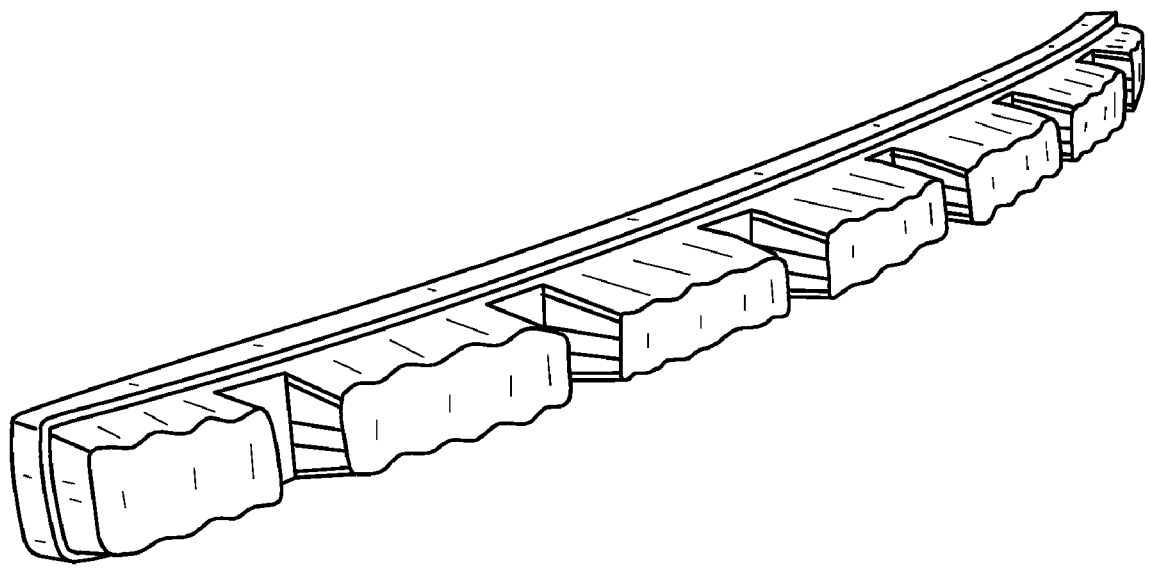
FIG. 3 is a frontal view showing an energy absorber made in accordance with the invention.

The peak injection pressure of the molding composition containing PET derived PBT was comparable to the control material. No significant difference in the processing performance of the two molding compositions was observed. FIG. 3 shows a picture of the energy absorber that was molded from the composition containing the PET derived PBT.

These examples show that articles can be made for modified polybutylene terephthalate random copolymers that have essentially identical physical properties as those made from virgin PBT compositions. Additionally, the examples showed that there was an improvement in resin flow and a reduced cycle time molding advantage. However, the many advantage associated with articles made from modified polybutylene terephthalate random copolymers is the observation that equivalent articles can be made but with a major improvement in several critical environmental features. Use of modified polybutylene terephthalate random copolymers provides a method to reduce $CO_2$ emissions, increase the usefulness of recycle PET and reduce the amount of non-renewable petroleum resources that would ordinarily be used to make virgin PBT from monomers.

Example 13

Multifilament Extruded Fiber

The purpose of this example was to demonstrate that multifilament fibers could be prepared from the PET derived PBT. This example discusses the preparation of a multifilament PET derived PBT fiber article via the extrusion process. PET derived PBT resin of iv 1.2 (made by the procedure as described in Example 1) was used to make the fiber article as follows. The resin was dried at 180 F (82 C) for a period that ranged from 4 to 8 hours. The resin was then extruded via a single screw extruder into a 128 filament fiber article. The temperature of the extruder was maintained between 500 and 520 F (260 to 272 C) and the draw ratio was maintained at 1.47.

The extruder was a horizontal extruder with a 90 degree bend at the spin head. The spin head had a metering pump, which fed the polymer melt into 2 spin packs. The spin packs had a total of 128 orifices that vertically fed the fibers to a finish applicator. From the finish applicator, the fibers were stretched via a set of rolls (4 in total) to the winder where they were wound up on a spool. The multifilament fiber article made via this process had a denier of 9.39 per filament, a tenacity of 1.84 g/denier and a tensile elongation @ break of 108%. The fibers produced in this example had a diameter of 32 microns approximately.

Although the present invention has been described in detail with reference to certain preferred versions thereof, other variations are possible. Therefore, the spirit and scope of the appended claims should not be limited to the description of the versions contained therein.

What is claimed is:

1. A composition of matter comprising an article derived from a molding composition containing:
    (a) from 5 to 99.99 wt % of a modified polybutylene terephthalate random copolymer that (1) is derived from a polyethylene terephthalate component selected from the group consisting of polyethylene terephthalate and polyethylene terephthalate copolymers and (2) comprises at least one residue derived from the polyethylene terephthalate component, and
    (b) from 0.01 to 95 wt % of a component member selected from the group consisting of (1) fillers, (2) carboxy reactive materials, (3) polyalkylene terephthalates, (4) combinations of polycarbonates and impact modifiers, (5) impact modifiers, (6) polycarbonates, and (7) combinations thereof;
    wherein the modified polybutylene terephthalate random copolymer, the component member selected from the group consisting of (1) fillers, (2) carboxy reactive materials, (3) polyalkylene terephthalates, (4) combinations of polycarbonates and impact modifiers, (5) impact modifiers, (6) polycarbonates, and (7) combinations thereof, and optionally at least one additive, are present in a total amount of 100 wt %; and wherein the at least one residue derived from the polyethylene terephthalate component is diethylene glycol groups in an amount ranging from 0.1 to 10 mole % based on 100 mole % of glycol in the molding composition.

2. The composition of matter of claim 1, wherein the residue derived from the polyethylene terephthalate component is selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, alkali salts, alkaline earth metal salts, phosphorous-containing compounds and anions, sulfur-containing compounds and anions, naphthalene dicarboxylic acids, 1,3-propanediol groups, and combinations thereof.

3. The composition of matter of claim 1, wherein the at least one residue derived from the polyethylene terephthalate component comprises a mixture of ethylene glycol and diethylene glycol.

4. The composition of matter of claim 3, wherein the residue derived from the polyethylene terephthalate component further comprises isophthalic acid.

5. The composition of matter of claim 3, wherein the residue derived from the polyethylene terephthalate component further comprises a cis isomer of the 1,3-cyclohexane dimethanol, cis isomer of 1,4-cyclohexane dimethanol, trans isomer of 1,3-cyclohexane dimethanol, trans isomer of 1,4-cyclohexane dimethanol and combinations thereof.

6. The composition of matter of claim 1, wherein the residue derived from the polyethylene terephthalate component is selected from the group consisting of the cis isomer of 1,3-cyclohexane dimethanol, cis isomer of 1,4-cyclohexane dimethanol, trans isomer of 1,3-cyclohexane dimethanol, trans isomer of 1,4-cyclohexane dimethanol and combinations thereof.

7. The composition of matter of claim 1, wherein the residue derived from the polyethylene terephthalate component is selected from the group consisting of ethylene glycol groups, diethylene glycol groups, isophthalic acid groups, cis isomer of cyclohexane dimethanol, trans isomer of cyclohexane dimethanol, and combinations thereof.

8. The composition of matter of claim 1, wherein the at least one residue derived from the polyethylene terephthalate component comprises a mixture of ethylene glycol, diethylene glycol, and a cobalt-containing compound.

9. The composition of matter of claim 8, wherein the at least one residue derived from the polyethylene terephthalate component further comprises isophthalic acid groups.

10. The composition of matter of claim 1, wherein the residue derived from the polyethylene terephthalate component further comprises a group selected from the group consisting of ethylene glycol groups and cyclohexane dimethanol groups and is in an amount ranging from 0.1 to 10 mole %, based on 100 mole % of glycol in the molding composition.

11. The composition of matter of claim 10, wherein the residue derived from the polyethylene terephthalate component further comprises isophthalic acid groups in an amount ranging from 0 to 10 mole %, based on 100 mole % of acid functionality in the modified polybutylene terephthalate random copolymer.

12. The composition of matter of claim 1 wherein the component member comprises a filler.

13. The composition of matter of claim 12, wherein the filler is present in an amount that is at least 0.5 wt %, and the filler is selected from the group consisting of glass fillers, ceramic fillers, carbon fillers, metal fillers, mineral fillers, nano-fillers, nano-composites, nanotubes, talc, and combinations thereof.

14. The composition of matter of claim 12, wherein the filler is a nanofiller, nanotube, or combination thereof in an amount that is less than 0.5 wt %.

15. The composition of matter of claim 1, wherein the component member comprises the carboxy reactive material that is present in an amount of at least 0.01 wt %, and the carboxy reactive material is selected from the group consisting of polymeric carboxy reactive materials, non-polymeric carboxy-reactive materials, and combinations thereof.

16. The composition of matter of claim 1, wherein the component member comprises the polyalkylene terephthalate, wherein the polyalkylene terephthalate is selected from the group consisting of polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, poly-xylylene terephthalate, polydianol terephthalates, polybutylene terephthalate, polyester naphthalates, and combinations thereof.

17. The composition of matter of claim 1, wherein the component member comprises polycarbonate and an impact modifier; and the polybutylene terephthalate random copolymer is present in an amount ranging from 5 to 90 wt %, the polycarbonate is present in an amount ranging from 5 to 90 wt %; and the impact modifier is present in an amount that is at least 1 wt %;
wherein the combined wt % of the polycarbonate and the impact modifier, the polybutylene terephthalate random copolymer, and optionally at least one additive, is 100 wt %.

18. The composition of matter of claim 1, wherein the component member comprises at least one impact modifier.

19. The composition of matter of claim 1, wherein the component member comprises at least one polycarbonate.

20. The composition of matter of claim 1, wherein the article further comprises an additive, and the additive is selected from the group consisting of flame retardants, stabilizers, quenchers, mold release agents, teflon-styrene acrylonitrile mixtures, and combinations thereof.

21. The composition of matter of claim 1, wherein the article is selected from the group consisting of injected molded articles, thermoformed articles, blow molded articles, extruded articles, pultruded articles, rotationally molded articles.

22. The composition of matter of claim 1, wherein the article comprises at least one fiber having a diameter ranging from 5 µm to 2000 µm.

23. The composition of matter of claim 1, wherein the article is a member selected from the group consisting of melt blown fibers, spun fibers, cold drawn fibers, electrostatic spun fibers, and extruded fibers.

24. The composition of matter of claim 1, wherein the article is a composite selected from the group consisting of (i) composites comprising polybutylene terephthalate random copolymers and glass fillers, (ii) composites comprising polybutylene terephthalate random copolymers and carbon fibers, (iii) composites comprising polycarbonate, polybutylene terephthalate random copolymers and carbon fibers, and (iv) composites comprising polycarbonate, polybutylene terephthalate random copolymers and glass fibers.

25. The composition of matter of claim 1, wherein the modified polybutylene terephthalate random copolymer is further derived from biomass-based 1,4-butanediol.

26. The composition of matter of claim 1, wherein an article derived from the composition has a $CO_2$ reduction index that of at least 0.06 kg.

27. A composition of matter comprising an article containing:
(a) from 5 to 99.99 wt % of a modified polybutylene terephthalate random copolymer that (1) is derived from polyethylene terephthalate and (2) comprises at least one residue derived from polyethylene terephthalate selected from the group consisting of ethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, alkali salts, alkaline earth metal salts, phosphorous-containing compounds and anions, sulfur-containing compounds and anions, naphthalene napthalene dicarboxylic acids, 1,3-propanediol groups, and combinations thereof;
(b) from 0.01 to 95 wt % of a component member selected from the group consisting of (1) fillers, (2) carboxy reactive materials, (3) polyethylene terephthalates, (4) combinations of polycarbonates and impact modifiers, (5) impact modifiers, (6) polycarbonates, and (7) combinations thereof;
wherein the residue derived from the polyethylene terephthalate is diethylene glycol groups in an amount ranging from 0.1 to 10 mole %, based on 100 mole % of glycol the molding composition; and
wherein the modified polybutylene terephthalate random copolymer, the component member selected from the group consisting of (1) fillers, (2) carboxy reactive materials, (3) polyethylene terephthalates, (4) combinations of polycarbonates and impact modifiers, (5) impact modifiers, (6) polycarbonates, and (7) combinations thereof, and optionally at least one additive, are present in a total amount of 100 wt %.

28. The composition of matter of claim 26, wherein the residue derived from the polyethylene terephthalate component further comprises isophthalic acid groups in an amount ranging from 0 to 10 mole %, based on 100 mole % of acid functionality in the modified polybutylene terephthalate random copolymer;
and wherein the article has at least one wall having a thickness ranging from 0.1 mm to 2000 mm; wherein the article is selected from the group consisting of injection molded articles, thermoformed articles, extruded articles, pultruded articles, rotationally molded articles, and blow molded articles.

29. The composition of matter of claim 26, wherein the modified polybutylene terephthalate random copolymer is further derived from biomass-based 1,4-butanediol.

30. The composition of matter of claim 26, wherein an article derived from the composition has a $CO_2$ reduction index that is 0.06 to 2.5 kg.

31. The composition of matter of claim 1, wherein the article is a bezel.

32. The composition of matter of claim 1, wherein the article is an energy absorber.

33. The composition of matter of claim 1, wherein the article is a connector.

34. An article comprising a bezel of claim 31, wherein the bezel is derived from a composition comprising:
(a) a polyester component comprising from 50 to 99.99 wt % of a modified polybutylene terephthalate random copolymer that (1) is derived from a polyethylene terephthalate component selected from the group consisting of polyethylene terephthalate and polyethylene terephthalate copolymers and (2) comprises at least one residue derived from the polyethylene terephthalate component;
(b) from 2 to 40 wt % of a filler component,
(c) from 0.01 to 3 wt % of a stabilizer,
(d) from 0 to 40 wt % of a polyalkylene terephthalate selected from the group consisting of polyethylene terephthalates, polycyclohexane terephthalates, copolyesters of terephthalic acid with comonomers containing cyclohexyl dimethanol and ethylene glycol, copolyesters of terephthalic acid with comonomers containing cyclohexyl dimethanol and ethylene glycol, polytrimethylene terephthalates, poly-xylylene terephthalates, polydianol terephthalate, polybutylene terephthalates, polyester naphthalates, and combinations thereof;

wherein components (a), (b), (c), (d), and optionally at least one additive, are present in a total amount of 100 wt %.

35. The article of claim 34, wherein the polyester component comprises
    (a) a first polyester component having an intrinsic viscosity ranging from 0.5 to 1.0 dL/g and comprising the modified polybutylene terephthalate random copolymer that (1) is derived from a polyethylene terephthalate component selected from the group consisting of polyethylene terephthalate and polyethylene terephthalate copolymers and (2) comprises at least one residue derived from the polyethylene terephthalate component, and
    (b) a second polyester component having an intrinsic viscosity ranging from 1.1 to 1.4 dL/g and comprising the modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component.

36. An article comprising an energy absorber of claim 32, wherein the composition comprises: a polyester component comprising from 20 to 70 wt % of a modified polybutylene terephthalate random copolymer that (1) is derived from a polyethylene terephthalate component selected from the group consisting of polyethylene terephthalate and polyethylene terephthalate copolymers and (2) comprises at least one residue derived from the polyethylene terephthalate component;
    (a) from 20 to 70 wt %, a polycarbonate component;
    (b) from 1 to 30 wt % of an impact modifier; and
    (c) from 0.001 to 1 wt % of a quencher;
    wherein components (a), (b), (c), and optionally at least one additive, are present in a total amount of 100 wt %.

37. The article of claim 36, wherein the composition contains less than 5 wt % of a filler component.

38. The article of claim 36, wherein the polyester component comprises
    (a) a first polyester component having an intrinsic viscosity ranging from 0.5 to 1.0 dL/g and comprising the modified polybutylene terephthalate random copolymer that (1) is derived from a polyethylene terephthalate component selected from the group consisting of polyethylene terephthalate and polyethylene terephthalate copolymers and (2) comprises at least one residue derived from the polyethylene terephthalate component, and
    (b) a second polyester component having an intrinsic viscosity ranging from 1.1 to 1.4 dL/g and comprising the modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component.

39. An article comprising a connector of claim 33, wherein the connector is derived from a composition comprising:
    (a) a polyester component comprising from 60 to 99.99 wt % of a modified polybutylene terephthalate random copolymer that (1) is derived from a polyethylene terephthalate component selected from the group consisting of polyethylene terephthalate and polyethylene terephthalate copolymers and (2) comprises at least one residue derived from the polyethylene terephthalate component;
    (b) from 0 to 20 wt % copolyetherester;
    (c) from 0 to 40 wt % of a filler,
    (d) from 0 to 20 wt % of a flame retarding component;
    (e) from 0.01 to 2 wt % of a stabilizer,
    wherein components (a), (b), (c), (d), (e), and optionally at least one additive, are present in a total amount of 100 wt %.

40. The article of claim 39, wherein the composition comprises from 1 to 10 wt % of the copolyetherester.

41. The article of claim 40, wherein the composition comprises less than 5 wt % of the filler.

42. The article of claim 39, wherein the composition comprises from 5 to 40 wt % of the filler.

43. The article of claim 42, wherein the composition comprises less than 5 wt % of the copolyetherester.

* * * * *